US012152697B2

(12) United States Patent
Tsai et al.

(10) Patent No.: US 12,152,697 B2
(45) Date of Patent: Nov. 26, 2024

(54) CONTROL VALVE

(71) Applicant: COOLER MASTER CO., LTD., Taipei (TW)

(72) Inventors: Shui-Fa Tsai, Taipei (TW); Sy-Chi Kuo, Taipei (TW); Hsin-Hung Chen, Taipei (TW)

(73) Assignee: COOLER MASTER CO., LTD., Taipei (TW)

( * ) Notice: Subject to any disclaimer, the term of this patent is extended or adjusted under 35 U.S.C. 154(b) by 0 days.

(21) Appl. No.: 18/209,407

(22) Filed: Jun. 13, 2023

(65) Prior Publication Data

US 2023/0323960 A1     Oct. 12, 2023

Related U.S. Application Data

(62) Division of application No. 17/188,555, filed on Mar. 1, 2021, now Pat. No. 11,719,347, which is a division
(Continued)

(30) Foreign Application Priority Data

May 14, 2018    (CN) .......................... 201820713027.9

(51) Int. Cl.
| | |
|---|---|
| *F16K 5/10* | (2006.01) |
| *F16K 5/04* | (2006.01) |
| *F16K 11/076* | (2006.01) |
| *F04B 49/22* | (2006.01) |
| *F16K 3/26* | (2006.01) |

(Continued)

(52) U.S. Cl.
CPC .................. *F16K 5/10* (2013.01); *F16K 5/04* (2013.01); *F16K 11/076* (2013.01); *F04B 49/225* (2013.01); *F16K 3/26* (2013.01); *F16K 5/0407* (2013.01); *F16K 5/06* (2013.01); *F16K 5/12* (2013.01); *Y10T 137/2501* (2015.04); *Y10T 137/7839* (2015.04)

(58) Field of Classification Search
CPC . F16K 5/10; F16K 5/04; F16K 11/076; F16K 3/26; F16K 5/0407; F16K 5/06; F16K 5/12; F04B 49/225; Y10T 137/2501; Y10T 137/7839
See application file for complete search history.

(56) References Cited

U.S. PATENT DOCUMENTS 2,996,083 A * 8/1961 Huska .................... F16K 11/085
                                                                   137/625.11
3,189,278 A * 6/1965 Drury .................. F24D 19/1006
                                                                  237/56

(Continued)

*Primary Examiner* — Craig M Schneider
*Assistant Examiner* — Christopher D Ballman
(74) *Attorney, Agent, or Firm* — Maschoff Brennan

(57) ABSTRACT

A control valve includes a valve body and a valve gate. The valve gate is movably located inside the inner space. The control valve has a lower flow rate limit which is greater than zero. That is, the lower flow rate limit has no necessary to be zero, thus it is acceptable to have a cylindrical valve gate but not a spherical valve gate, and a diameter of the cylindrical valve gate is be smaller than a caliber of an opening of the valve body. Therefore, the valve gate can be directly installed into the valve body via the opening, which allows the valve body to be made of a single piece so as to simplify the processes of manufacturing and assembly.

4 Claims, 29 Drawing Sheets

Related U.S. Application Data of application No. 16/018,842, filed on Jun. 26, 2018, now Pat. No. 10,969,024.

(51) Int. Cl.
*F16K 5/06* (2006.01)
*F16K 5/12* (2006.01)

(56) References Cited

U.S. PATENT DOCUMENTS

| | | | | |
|---|---|---|---|---|
| 5,148,976 | A * | 9/1992 | Reid | F16K 11/044 236/12.2 |
| 5,323,960 | A * | 6/1994 | Kline | G05D 23/1346 236/12.2 |
| 5,927,330 | A * | 7/1999 | Minton | F16K 11/085 251/367 |
| 5,983,937 | A * | 11/1999 | Makihara | F01P 7/16 251/207 |
| 6,079,625 | A * | 6/2000 | Lebkuchner | G05D 23/1346 236/12.2 |
| 6,250,559 | B1 * | 6/2001 | Knauss | G05D 23/1346 236/12.2 |
| 6,328,219 | B1 * | 12/2001 | Taylor | G05D 23/1346 236/100 |
| 8,733,666 | B2 * | 5/2014 | Beagen | F16K 31/002 236/12.1 |
| 8,776,829 | B2 * | 7/2014 | Sugie | F24H 15/174 137/625.46 |
| 10,215,293 | B2 * | 2/2019 | Hiraoka | H01L 23/473 |
| 10,989,319 | B2 * | 4/2021 | Kusumoto | F16K 27/065 |
| 11,073,309 | B2 * | 7/2021 | Seki | F16K 11/00 |
| 11,480,258 | B2 * | 10/2022 | Ono | F16K 31/041 |

* cited by examiner

CONTROL VALVE

CROSS-REFERENCE TO RELATED APPLICATIONS

This patent application is a divisional patent application of U.S. patent application Ser. No. 17/188,555 filed on Mar. 1, 2021 and entitled "CONTROL VALVE", which is a divisional patent application of U.S. patent application Ser. No. 16/018,842 filed on Jun. 26, 2018 and entitled "CONTROL VALVE", which is a non-provisional application claims priority under 35 U.S.C. § 119(a) on Patent Application No(s). 201820713027.9 filed in China on May 14, 2018, the entire contents of which are hereby incorporated by reference.

TECHNICAL FIELD

The disclosure relates to a control valve.

BACKGROUND

In a cooling system, a control valve or bypass valve is commonly used to change the direction of fluid. Taken the control valve as an example, there are a rotary spool-type valve and a slide spool-type valve. The rotary spool-type valve is a valve that can pivot about its axis, and the slide spool-type valve is a valve that can slide along its axis. These valves can be operated either manually or electrically.

Generally, in order to ensure low leakage, a valve gate of the control valve is usually made spherical. However, the spherical valve gate is larger than a through hole of a valve body of the control valve, thus the spherical valve gate cannot be directly installed into the valve body via the through hole. The valve body must be able to be disassembled into many pieces for installing the spherical valve gate into the valve body. This makes the configuration of the control valve complicated and is inconvenient for assembly and manufacturing.

SUMMARY

Accordingly, the present disclosure provides a control valve which is simple in structure so as to avoid the inconveniences in the conventional control valve.

One embodiment of the disclosure provides a control valve, including a valve body and a valve gate. The valve gate is movably located inside the inner space. The control valve has a lower flow rate limit which is greater than zero.

One embodiment of the disclosure provides a control valve including a valve body and a valve gate. The valve body has an inner space, at least one fluid inlet and at least one fluid outlet, the at least one fluid inlet and the at least one fluid outlet correspond to the inner space, the valve body has an inner wall surrounding the inner space. The valve gate has an external wall and at least one main channel, the valve gate is movably located inside the inner space, the external wall and the inner wall form a bypass channel, the main channel penetrates through the external wall, and the main channel has at least one inlet end and at least one outlet end which respectively correspond to the at least one fluid inlet and the at least one fluid outlet. The valve gate is movable with respect to the valve body and pivotable between a closed position and an opened position; when the valve gate is in the closed position, the at least one inlet end and the at least one outlet end of the main channel are blocked by the valve body, such that the fluid inlet is connected to the fluid outlet only via the bypass channel; when the valve gate is in the opened position, the at least one inlet end and the at least one outlet end of the main channel are respectively connected to the at least one fluid inlet and the at least one fluid outlet, such that the fluid inlet is connected to the fluid outlet via the main channel and the bypass channel.

One embodiment of the disclosure provides a control valve includes a valve body and a valve gate. The valve body has at least one fluid inlet and at least one fluid outlet. The valve gate has at least one main channel and at least one bypass channel, the at least one main channel has at least one inlet end and at least one outlet end, a cross-sectional area of the main channel is greater than a cross-sectional area of the bypass channel, the valve gate is movably disposed within the valve body and is pivotable between a closed position and an opened position. When the valve gate is in the closed position, the at least one inlet end and the at least one outlet end of the main channel are blocked by the valve body, such that the fluid inlet is connected to the fluid outlet only via the bypass channel. When the valve gate is in the opened position, the inlet end and the outlet end of the bypass channel are blocked by the valve body, such that the fluid inlet is connected to the fluid outlet only via the main channel.

One embodiment of the disclosure provides a control valve including a valve body and a valve gate. The valve body has an inner space, an opening, a fluid inlet and a fluid outlet, and the opening, the fluid inlet and the fluid outlet correspond to the inner space. The valve gate includes an insertion portion and a cylindrical head connected to each other. The cylindrical head has a main channel having an inlet end and an outlet end which respectively correspond to the fluid inlet and the fluid outlet. A diameter of the cylindrical head is smaller than a caliber of the opening, such that the cylindrical head penetrates through the opening and the cylindrical head is movably located inside the inner space.

One embodiment of the disclosure provides a control valve including a valve body, a valve gate and at least one first seal ring. The valve body is made of a single piece, has an inner space, an opening, a fluid inlet and a fluid outlet, and the opening, the fluid inlet and the fluid outlet correspond to the inner space. The valve gate has a main channel, the main channel has an inlet end and an outlet end which correspond to the fluid inlet and the fluid outlet, the valve gate is disposed into the inner space via the opening. The at least one first seal ring is sleeved on the valve gate and located between and pressed by the valve body and the valve gate, such that the valve gate and the at least one first seal ring together seal the opening.

According to the control valve as discussed in above, the control valve has a lower flow rate limit which is greater than zero when it is in the closed position, which ensures fluid to still flow to a lower temperature heat source even when most of the fluid flows to a higher temperature heat source, thereby having a minimal cooling effect on the lower temperature heat source.

Furthermore, the lower flow rate limit has no necessary to be zero, thus it is acceptable to have a cylindrical valve gate but not a spherical valve gate, and a diameter of the cylindrical valve gate is smaller than a caliber of an opening of the valve body. Therefore, the valve gate can be directly installed into the valve body via the opening, which allows the valve body to be made of a single piece so as to simplify the processes of manufacturing and assembly.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
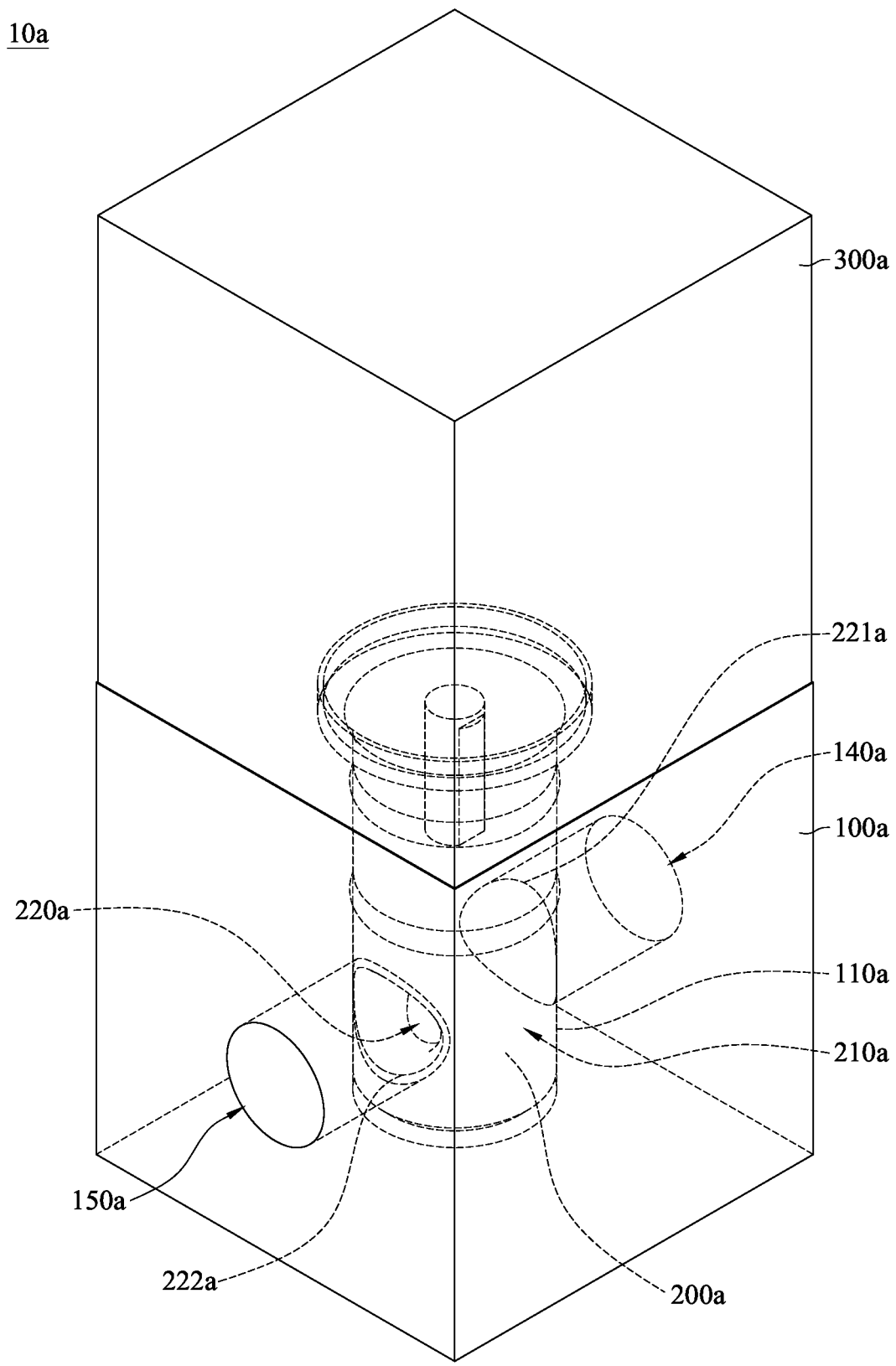
FIG. 1 is a perspective view of a control valve according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

Figure 2:
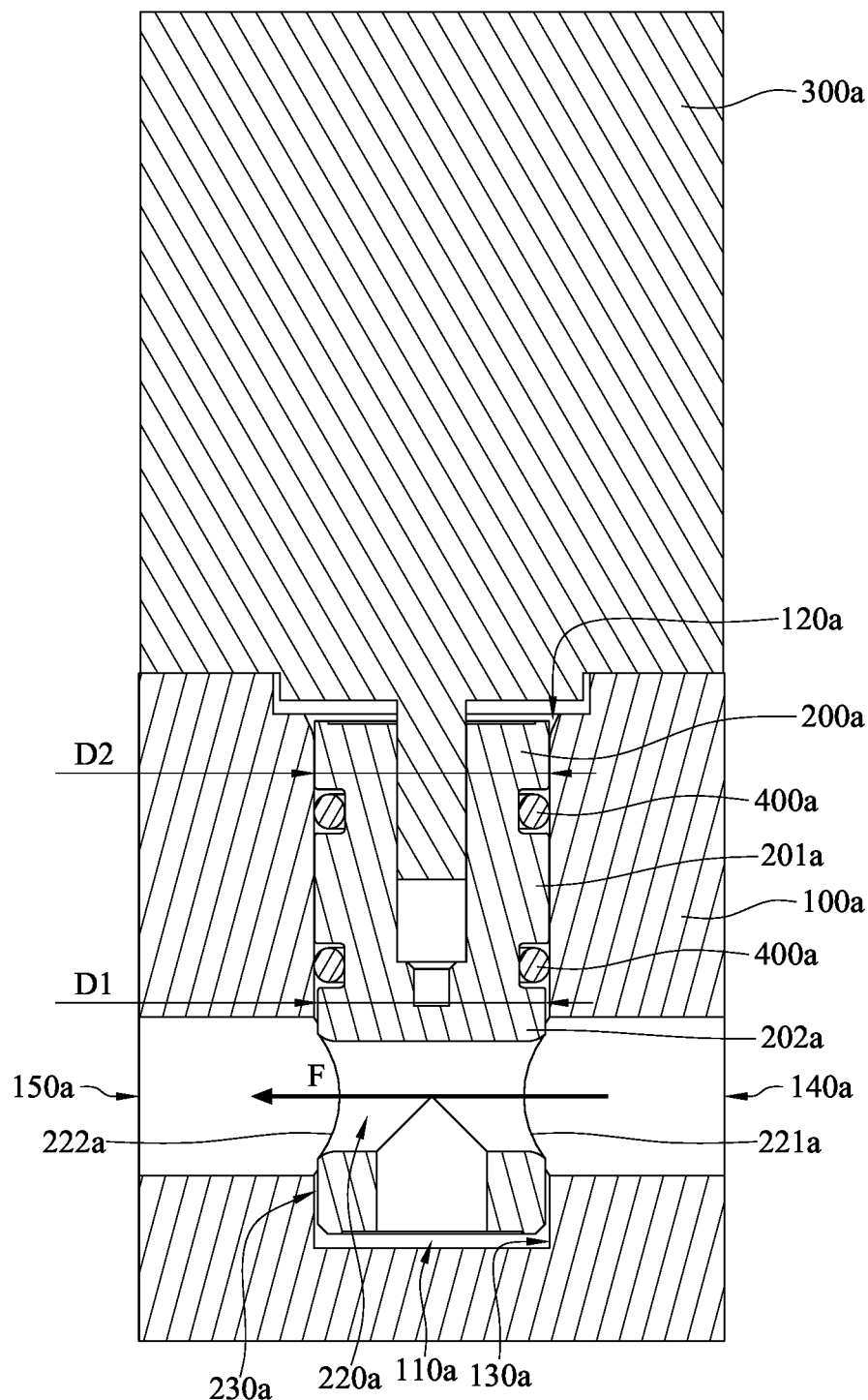
FIG. 2 is a cross-sectional view of FIG. 1.
Figure 3:
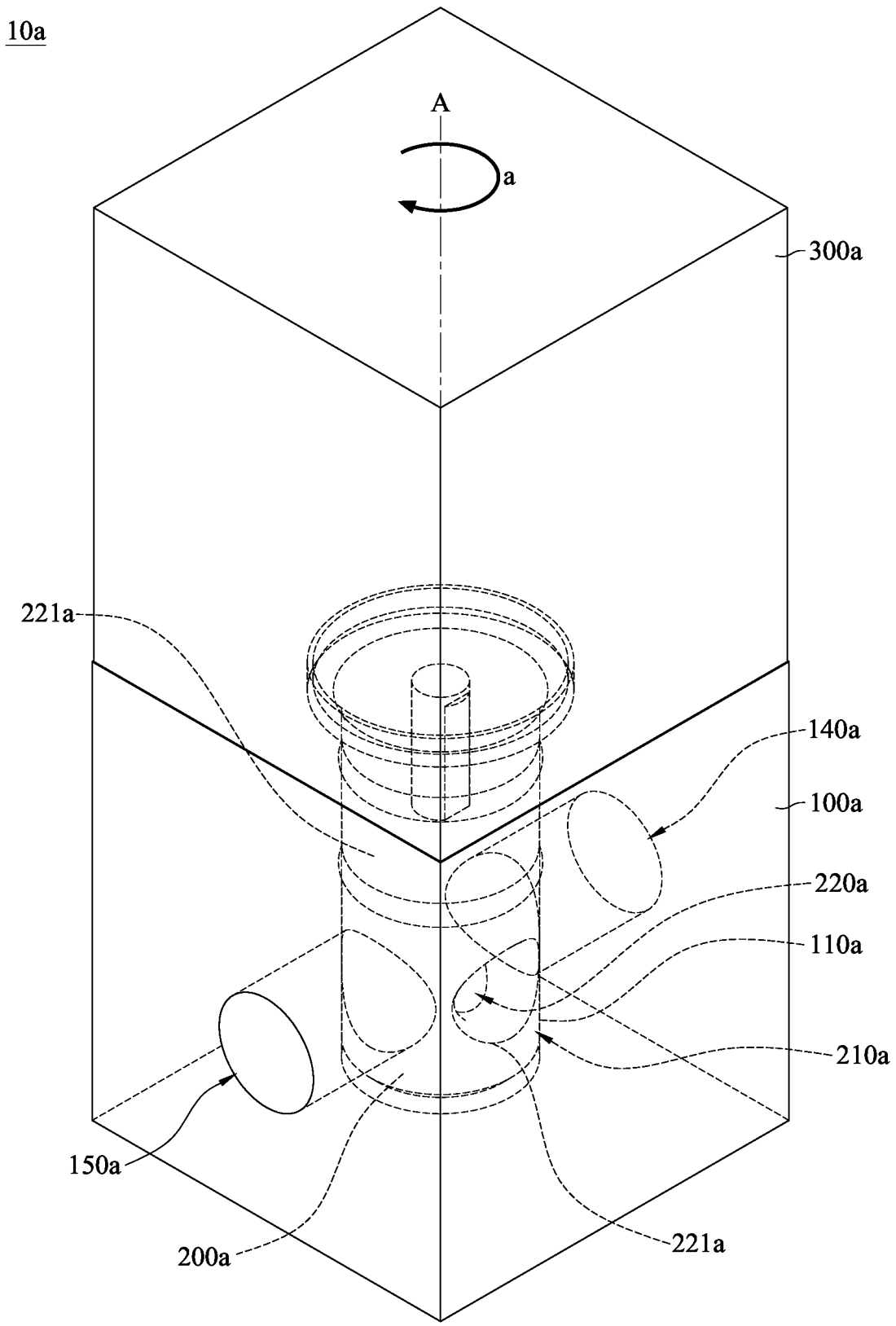
FIG. 3 is a perspective view of the valve gate in FIG. 1.
Figure 4:
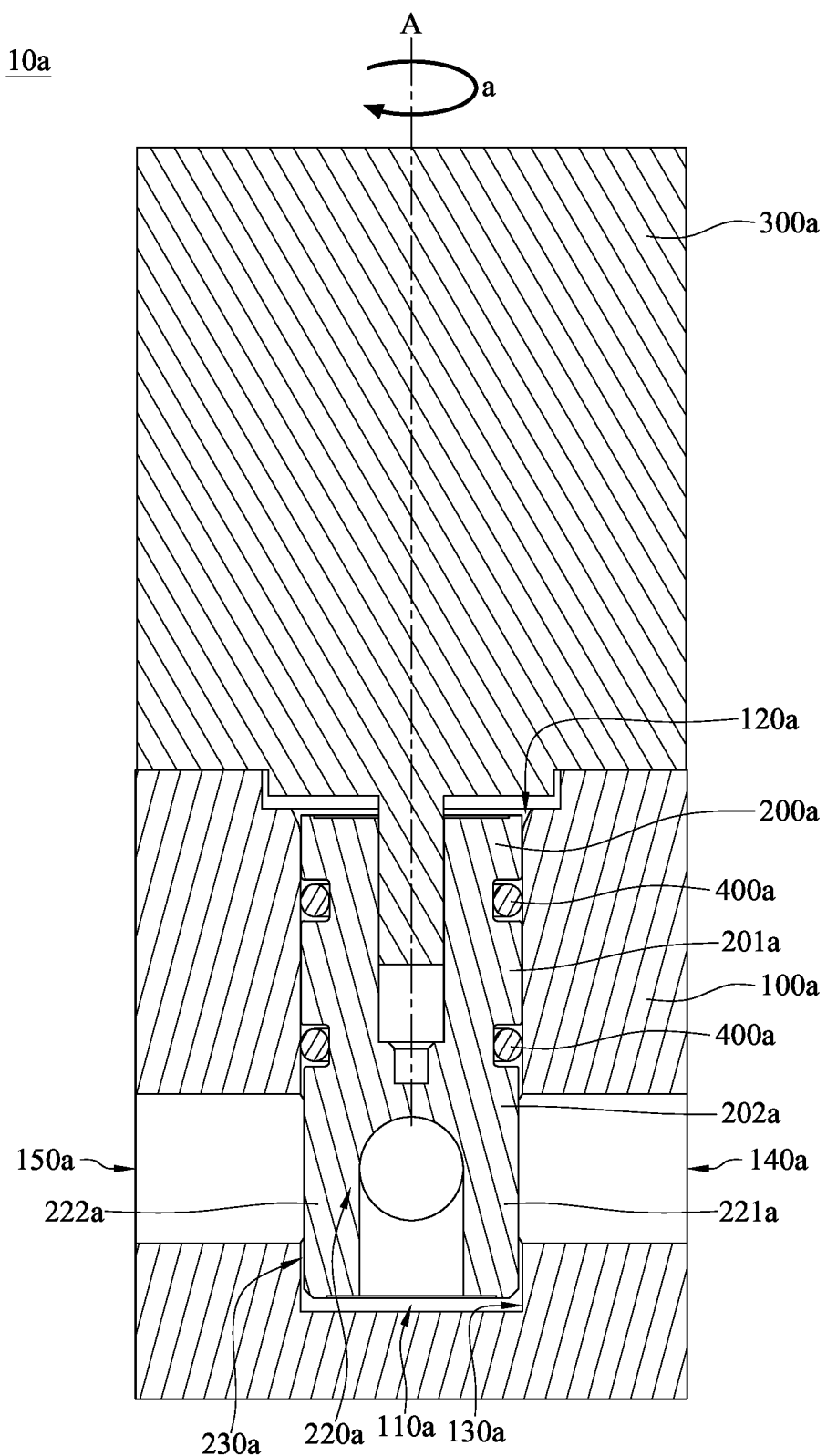
FIG. 4 is a cross-sectional view of FIG. 3.

Please refer to FIGS. 1 to 4. FIG. 1 is a perspective view of a control valve according to a first embodiment of the present disclosure. FIG. 2 is a cross-sectional view of FIG. 1. FIG. 3 is a perspective view of the valve gate in FIG. 1. FIG. 4 is a cross-sectional view of FIG. 3.

This embodiment provides a control valve 10a. The control valve 10a includes a valve body 100a, a valve gate 200a, a driving element 300a and a plurality of seal rings 400a.

The valve body 100a is, for example, made of a single piece, by injection molding process or cutting process. The valve body 100a has an inner space 110a and an opening 120a corresponding to the inner space 110a. The valve body 100a has an inner wall 130a surrounding the inner space 110a. The valve body 100a further has a fluid inlet 140a and a fluid outlet 150a which penetrate through the inner wall 130a and are connected to the inner space 110a. That is, the opening 120a, the fluid inlet 140a and the fluid outlet 150a all are connected to the inner space 110a.

The valve gate 200a is pivotably located inside the inner space 110a and is pivotable between a closed position (please refer to FIGS. 3 and 4) and an opened position (please refer to FIGS. 1 and 2). In detail, the valve gate 200a includes an insertion portion 201a and a cylindrical head 202a which are connected to each other. The insertion portion 201a is disposed through the opening 120a, and the cylindrical head 202a is located in the inner space 110a. The seal rings 400a are, for example, rubber rings, and are sleeved on the insertion portion 201a, such that the insertion portion 201a and the seal rings 400a together seal the opening 120a. The driving element 300a is fixed on the valve body 100a, and is configured to drive the valve gate 200a to pivot about an axis A (e.g., in a direction of a) with respect to the valve body 100a.

The cylindrical head 202a has an external wall 210a and a main channel 220a. The main channel 220a is in a cylinder shape. The main channel 220a penetrates through the external wall 210a. The main channel 220a has an inlet end 221a and an outlet end 222a which are opposite to each other. When the valve gate 200a is in the opened position (please refer to FIGS. 1 and 2), the inlet end 221a and the outlet end 222a are respectively aligned with the fluid inlet 140a and the fluid outlet 150a of the valve body 100a, such that fluid can flow in a direction of F from the fluid inlet 140a to the fluid outlet 150a via the main channel 220a. When the valve gate 200a is in the closed position (please refer to FIGS. 3 and 4), the inlet end 221a and the outlet end 222a and the fluid inlet 140a and the fluid outlet 150a are completely unaligned, which prevents fluid from flowing through the main channel 220a.

In this embodiment, the inlet end 221a of the main channel 220a and the fluid inlet 140a of the valve body 100a are the same in shape, and/or the inlet end 221a of the main channel 220a and the fluid inlet 140a of the valve body 100a are the same in size. By this configuration, when the inlet end 221a and the outlet end 222a of the main channel 220a are respectively aligned with the fluid inlet 140a and the fluid outlet 150a of the valve body 100a, fluid can flow in the direction of F from the fluid inlet 140a to the fluid outlet 150a in a smoother manner. However, the present disclosure is not limited to such configuration. In some other embodiments, as long as fluid can flow in the direction of F from the fluid inlet 140a to the fluid outlet 150a, the inlet end 221a of the main channel 220a and the fluid inlet 140a of the valve body 100a may be in different shapes and sizes.

The external wall 210a and the inner wall 130a are loose fit, and there is a bypass channel 230a formed between the external wall 210a and the inner wall 130a. The flow rate of the bypass channel 230a is less than the flow rate of the main channel 220a. The bypass channel 230a is an annular passage extending from the fluid inlet 140a to the fluid outlet 150a. Thus, whether the valve gate 200a is in the opened position or the closed position, the fluid inlet 140a is connected to the fluid outlet 150a via the bypass channel 230a. That is, when the valve gate 200a is in the opened position, fluid can flow from the fluid inlet 140a and the fluid outlet 150a via both the main channel 220a and the bypass channel 230a. Therefore, there is an upper limit flow rate when the control valve 10a is in the opened position. When the valve gate 200a is in the closed position, fluid still can flow from the fluid inlet 140a to the fluid outlet 150a via the bypass channel 230a; thus there is a lower flow rate limit when the control valve 10a is in the closed position, and the lower flow rate limit is greater than zero.

Then, taking a liquid cooling system in a server cabinet (not shown) as an example to explain the reason why the lower flow rate limit of the control valve 10a is greater than zero. The liquid cooling system in the server cabinet (not shown) includes a plurality of water blocks, a plurality of pipes, a pump and a plurality of control valves 10a. The water blocks are disposed at different servers in the server cabinet so as to exchange heat with these servers, or disposed at different heat sources in the same server so as to exchange heat with these heat sources. The pipes are connected between the water blocks and the pump so as to form a cooling circulation. The control valves 10a are installed on the pipes in order to control the flow rate for each heat source. It is understood that a higher temperature heat source requires larger flow rate, and a lower temperature heat source requires lesser flow rate, thus the control valve 10a corresponding to the higher temperature heat source would be switched to the opened position, and the other control valve 10a corresponding to the lower temperature heat source would be switched to the closed position so as to ensure most of the fluid to flow to the higher temperature heat source. Even so, the control valve 10a corresponding to the lower temperature heat source still have a lower flow rate limit which is greater than zero, thus fluid still will flow to the lower temperature heat source even when most of the fluid flows to the higher temperature heat source, thereby having a minimal cooling effect on the lower temperature heat source.

On the other hand, the lower flow rate limit has no necessary to be zero, thus it is acceptable to have a cylindrical valve gate 200a but not a spherical valve gate, and a diameter D1 of the cylindrical head 202a can be smaller than a caliber D2 of an opening 120a. Therefore, the cylindrical head 202a of the valve gate 200a can be directly installed into the valve body 100a via the opening 120a, which allows the valve body 100a to be made of a single piece so as to simplify the processes of manufacturing and assembly of the control valve 10a.

In this embodiment, the quantity of the seal rings is two, but the present disclosure is not limited thereto. In some other embodiments, the control valve may only have one seal ring or more than three seal rings. Furthermore, in the previous embodiment, the valve gate is driven by an electric motor, but the present disclosure is not limited thereto. In some other embodiments, the valve gate may be driven or controlled by fluid pressure. In addition, the valve body may further have heat fins for heat dissipation.

However, it is noted that the bypass channel 230a formed between the external wall 210a of the valve gate 200a and the inner wall 130a of the valve body 100a is one of the ways to achieve a lower flow rate limit greater than zero, the other variations for achieving the same are described in the following paragraphs.

Figure 5:
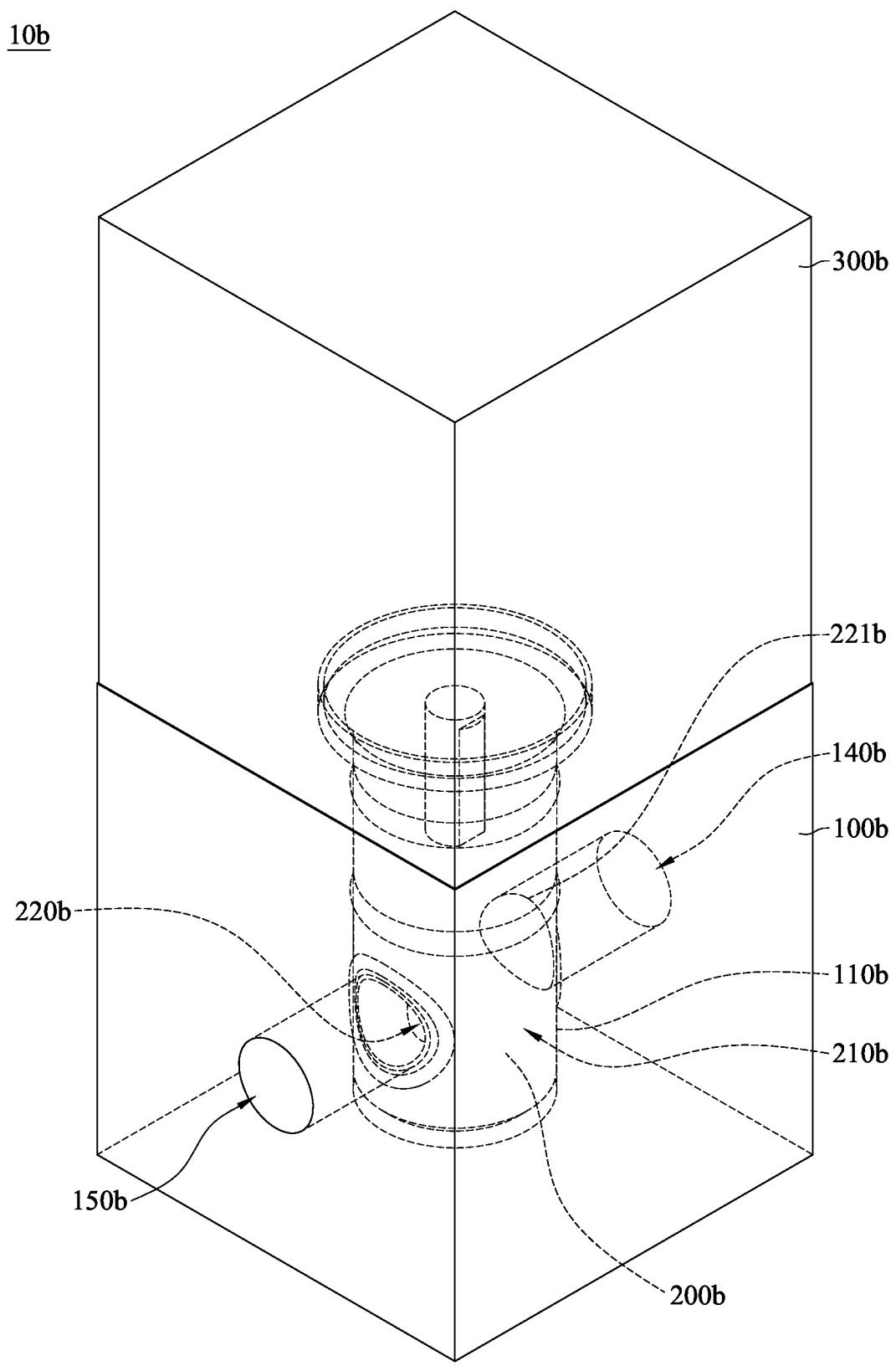
FIG. 5 is a perspective view of a control valve according to a second embodiment of the present disclosure.
Figure 6:
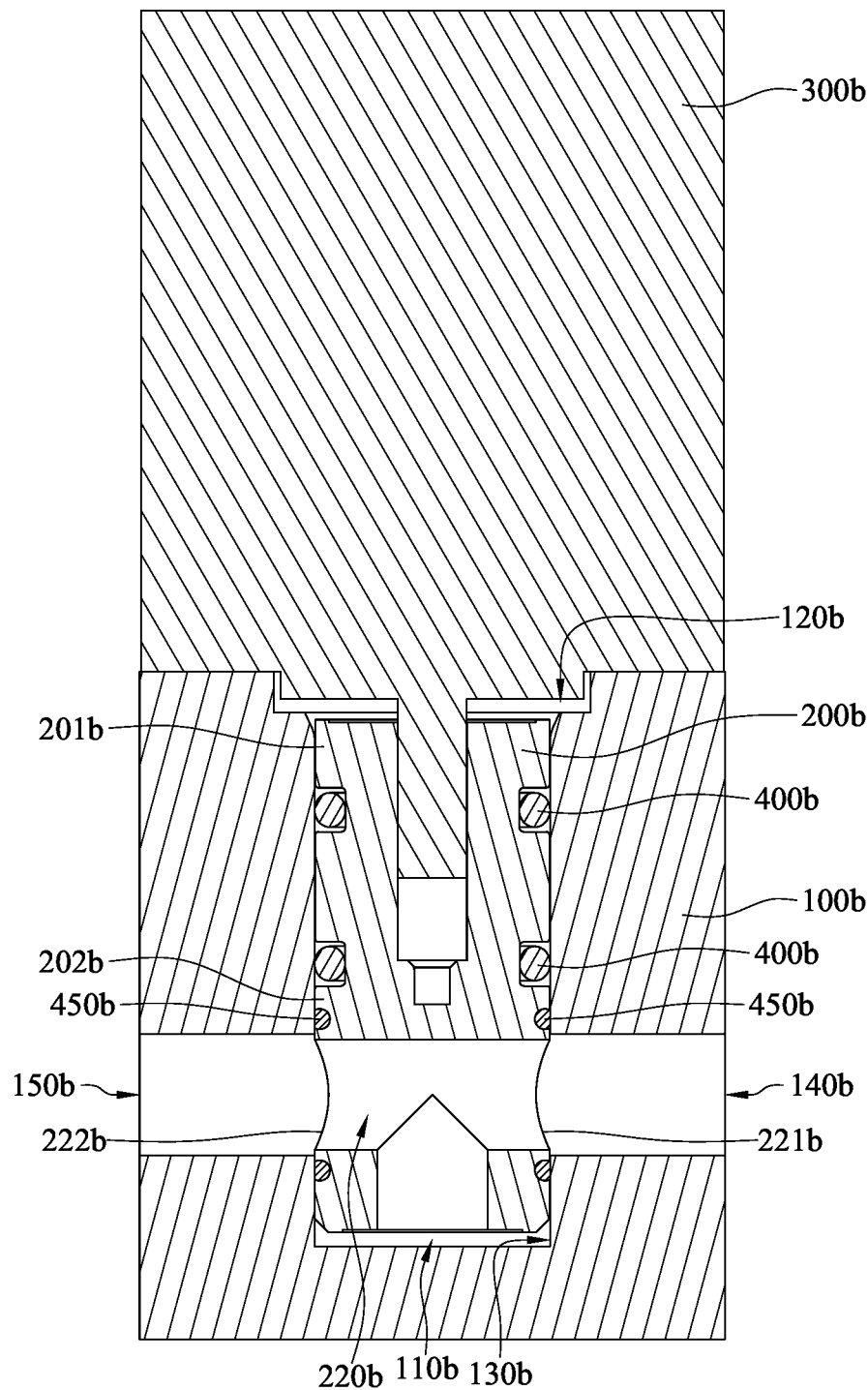
FIG. 6 is a cross-sectional view of FIG. 5.

When the valve gate is in the opened position, fluid may only flow through the main channel instead of flowing through the bypass channel. Please refer to FIGS. 5 and 6. FIG. is a perspective view of a control valve according to a second embodiment of the present disclosure. FIG. 6 is a cross-sectional view of FIG. 5.

This embodiment provides a control valve 10b. The control valve 10b includes a valve body 100b, a valve gate 200b, a driving element 300b, two first seal rings 400b and two second seal rings 450b.

The valve body 100b has an inner space 110b and an opening 120b which corresponds to the inner space 110b. The valve body 100b has an inner wall 130b surrounding the inner space 110b. The valve body 100b further has a fluid inlet 140b and a fluid outlet 150b which penetrate through the inner wall 130b. That is, the opening 120b, the fluid inlet 140b and the fluid outlet 150b are all connected to the inner space 110b.

The valve gate 200b is pivotably located inside the inner space 110b. In detail, the valve gate 200b includes an insertion portion 201b and a cylindrical head 202b which are connected to each other. The insertion portion 201b penetrates through the opening 120b, and the cylindrical head 202b is located in the inner space 110b. The cylindrical head 202b has an external wall 210b and a main channel 220b. The main channel 220b is in a cylinder shape. The main channel 220b penetrates through the external wall 210b. The main channel 220b has an inlet end 221b and an outlet end 222b which are opposite to each other. The two first seal rings 400b and the two second seal rings 450b are, for example, rubber rings. The first seal rings 400b are sleeved on the insertion portion 201b, such that the insertion portion 201b and the first seal rings 400b together seal the opening 120b. The second seal rings 450b are disposed on the cylindrical head 202b, and respectively surround the inlet end 221b and the outlet end 222b of the main channel 220b. The driving element 300b is fixed on the valve body 100b, and is configured to drive the valve gate 200b to pivot with respect to the valve body 100b.

Since the second seal rings 450b respectively surround the inlet end 221b and the outlet end 222b of the main channel 220b, such that, when the valve gate 200b is in the opened position, fluid only can flow from the fluid inlet 140b to the fluid outlet 150b via the main channel 220b instead of flowing through the aforementioned bypass channel 230a.

Figure 7:
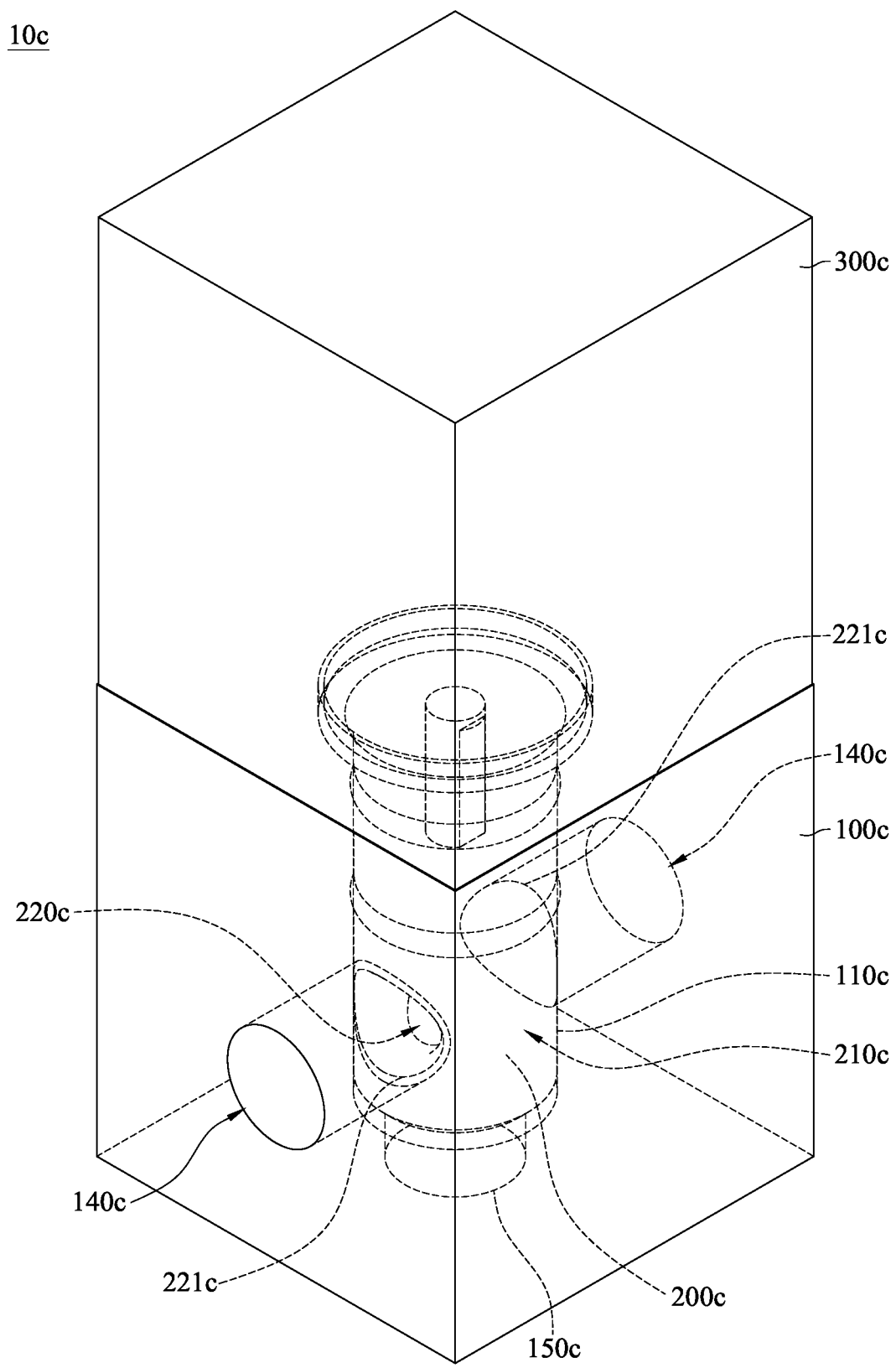
FIG. 7 is a perspective view of a control valve according to a third embodiment of the present disclosure.
Figure 8:
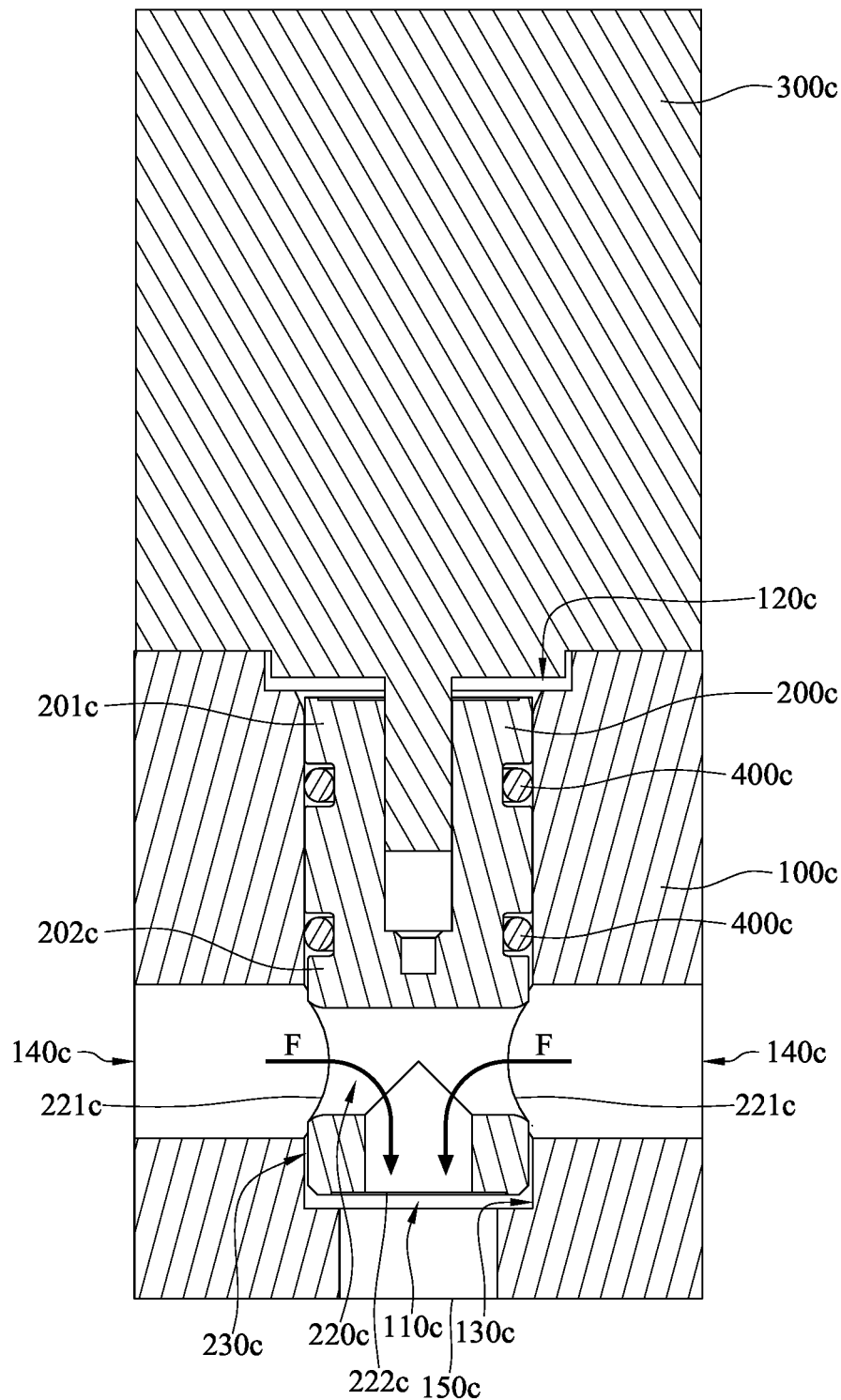
FIG. 8 is a cross-sectional view of FIG. 7.

In addition, the quantities of the inlet end and the outlet end are not restricted. For example, please refer to FIGS. 7 and 8. FIG. 7 is a perspective view of a control valve according to a third embodiment of the present disclosure. FIG. 8 is a cross-sectional view of FIG. 7.

This embodiment provides a control valve 10c. The control valve 10c includes a valve body 100c, a valve gate 200c, a driving element 300c and two seal rings 400c.

The valve body 100c has an inner space 110c and an opening 120c which corresponds to the inner space 110c. The valve body 100c has an inner wall 130c surrounding the inner space 110c. The valve body 100c further has two fluid inlets 140c and a fluid outlet 150c which penetrate through the inner wall 130c. That is, the opening 120c, the two fluid inlets 140c and the fluid outlet 150c are all connected to the inner space 110c. From the viewpoint of FIG. 7, the two fluid inlets 140c are located at two opposite sides of the valve body 100c, and the fluid outlet 150c is located at the bottom surface of the valve body 100c.

The valve gate 200c is pivotably located inside the inner space 110c. In detail, the valve gate 200c includes an insertion portion 201c and a cylindrical head 202c which are connected to each other. The insertion portion 201c penetrates through the opening 120c, and the cylindrical head 202c is located in the inner space 110c. The cylindrical head 202c has an external wall 210c and a main channel 220c. The main channel 220c is a T-shaped channel, and penetrates through the external wall 210c. The main channel 220c has two inlet ends 221c which are opposite to each other and an outlet end 222c. The two inlet ends 221c respectively correspond to the two fluid inlets 140c, and the outlet end 222c corresponds to the fluid outlet 150c.

The two seal rings 400c are, for example, rubber rings. The seal rings 400c are sleeved on the insertion portion 201c, such that the insertion portion 201c and the first seal rings 400c together seal the opening 120c. The driving element 300c is fixed on the valve body 100c, and is configured to drive the valve gate 200c to pivot with respect to the valve body 100c.

When the valve gate 200c is in the opened position (please refer to FIGS. 7 and 8), the two inlet ends 221c and the outlet end 222c of the main channel 220c are respectively aligned with the two fluid inlets 140c and the fluid outlet 150c of the valve body 100c, such that fluid can flow from the fluid inlet 140c to the fluid outlet 150c via the main channel 220c along the direction of F.

The embodiment in FIG. 7 shows a case of two fluid inlets and one fluid outlet, but the present disclosure is not limited thereto. In some other embodiments, it can be changed into a case of two fluid outlets and one fluid inlet.

Figure 9:
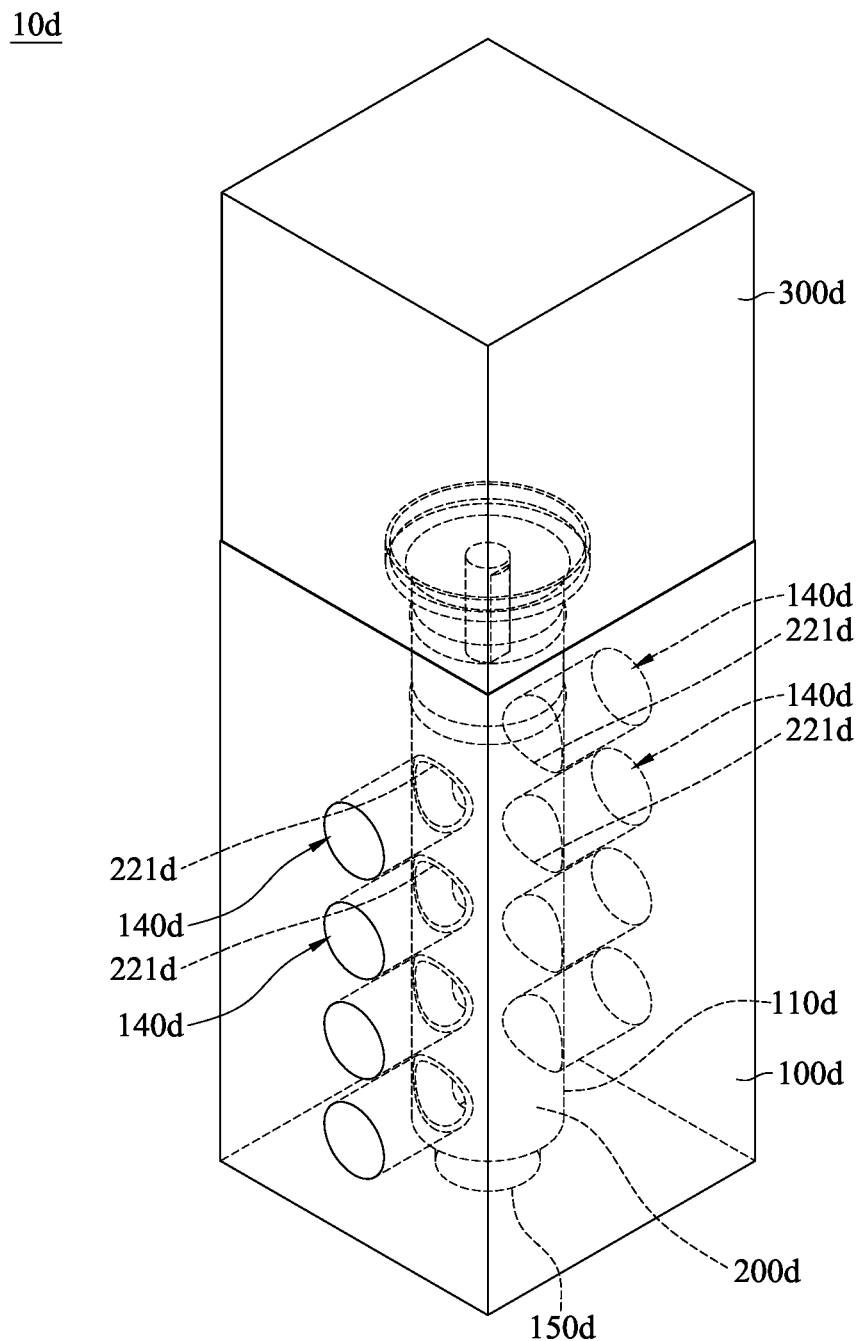
FIG. 9 is a perspective view of a control valve according to a fourth embodiment of the present disclosure.
Figure 10:
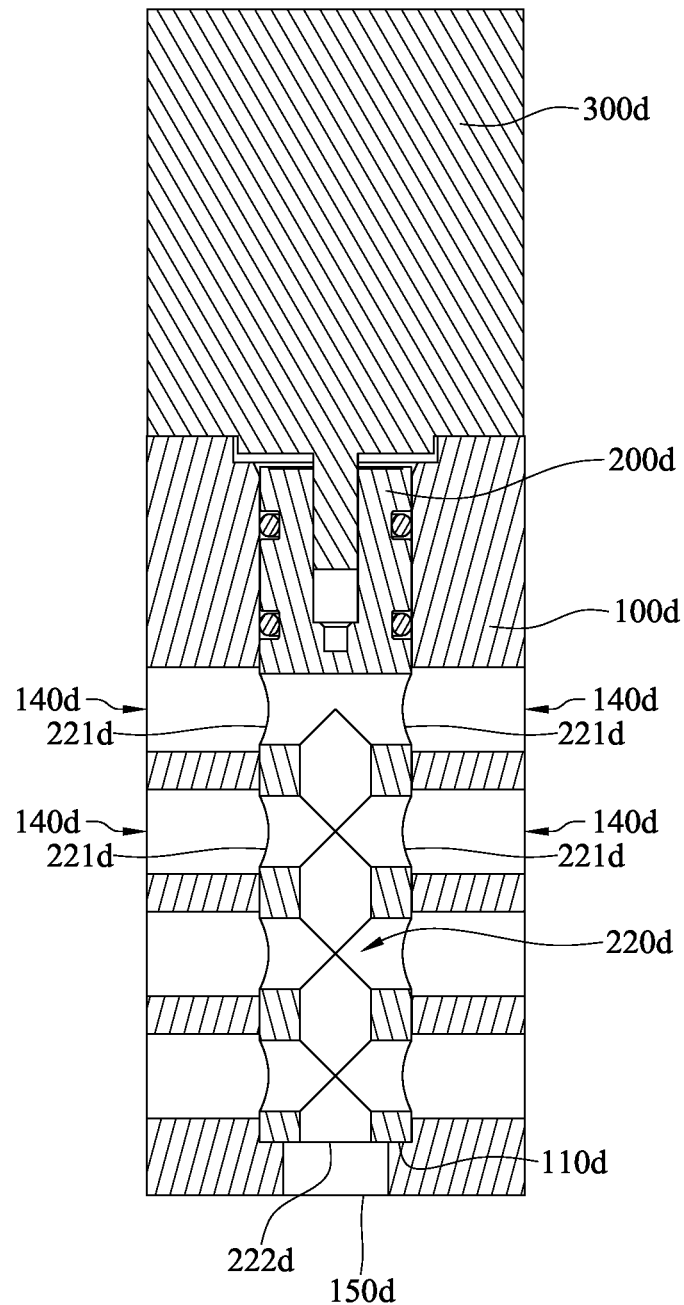
FIG. 10 is a cross-sectional view of FIG. 9.

For example, please refer to FIGS. 9 and 10. FIG. 9 is a perspective view of a control valve according to a fourth embodiment of the present disclosure. FIG. 10 is a cross-sectional view of FIG. 9.

This embodiment provides a control valve 10d. The control valve 10d includes a valve body 100d, a valve gate 200d and a driving element 300d. The valve gate 200d is pivotably located inside the inner space 110d. The driving element 300d is fixed on the valve body 100d, and is configured to drive the valve gate 200d to pivot with respect to the valve body 100d.

In detail, the valve body 100d has a plurality of fluid inlets 140d and a fluid outlet 150d. From the viewpoint of FIG. 9, the fluid inlets 140d are divided into two groups, and the two groups of fluid inlets 140d are respectively located at two opposite sides of the valve body 100d. The fluid outlet 150d is located at the bottom surface of the valve body 100d.

The valve gate 200d has a main channel 220d. The main channel 220d has two groups of inlet ends 221d which are opposite to each other and an outlet end 222d. The inlet ends 221d correspond to the fluid inlets 140d, and the outlet end 222d corresponds to the fluid outlet 150d. The fluid inlets 140d and the inlet ends 221d are arranged along an axial direction of the valve gate 200d.

Figure 11:
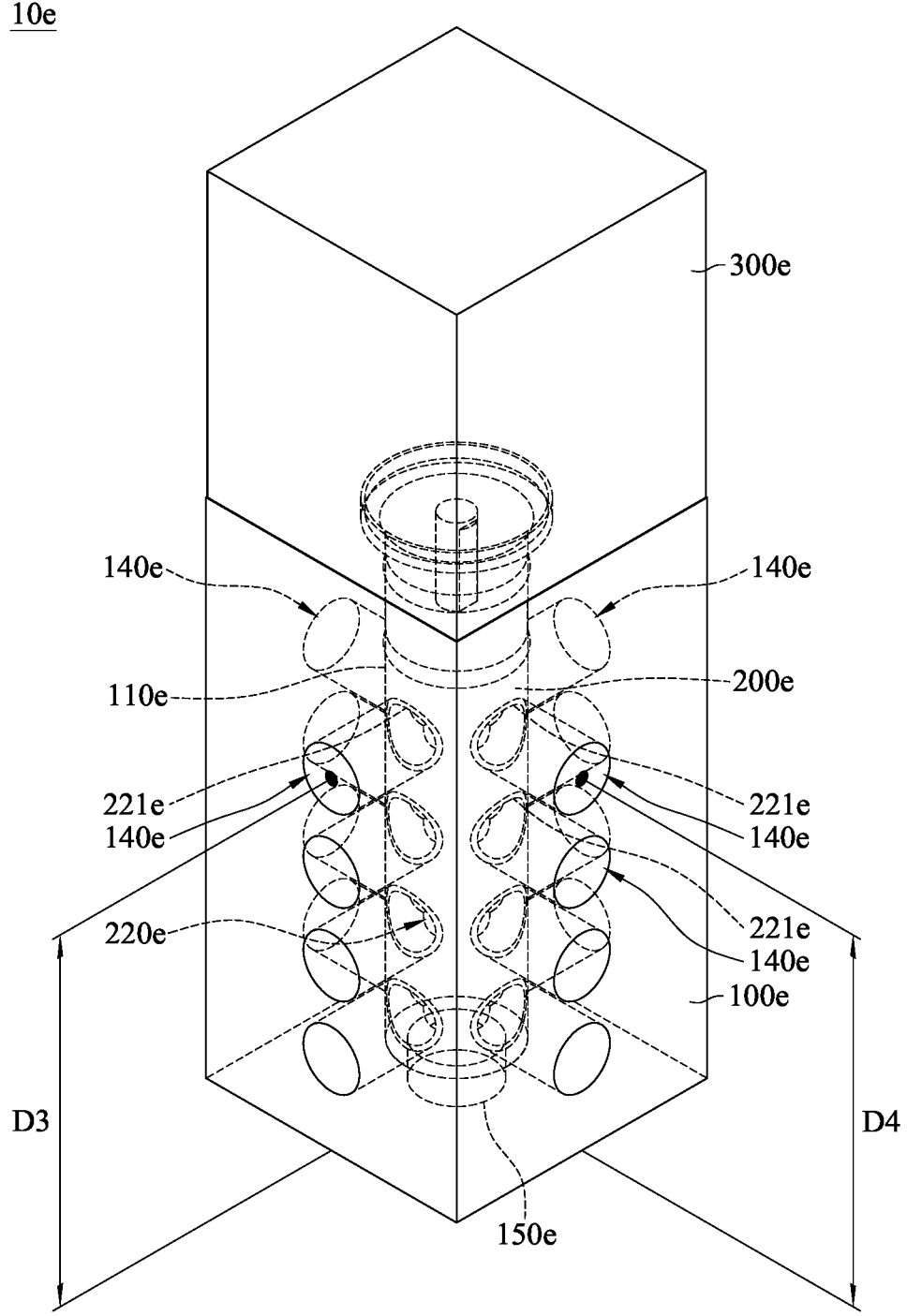
FIG. 11 is a perspective view of a control valve according to a fifth embodiment of the present disclosure.
Figure 12:
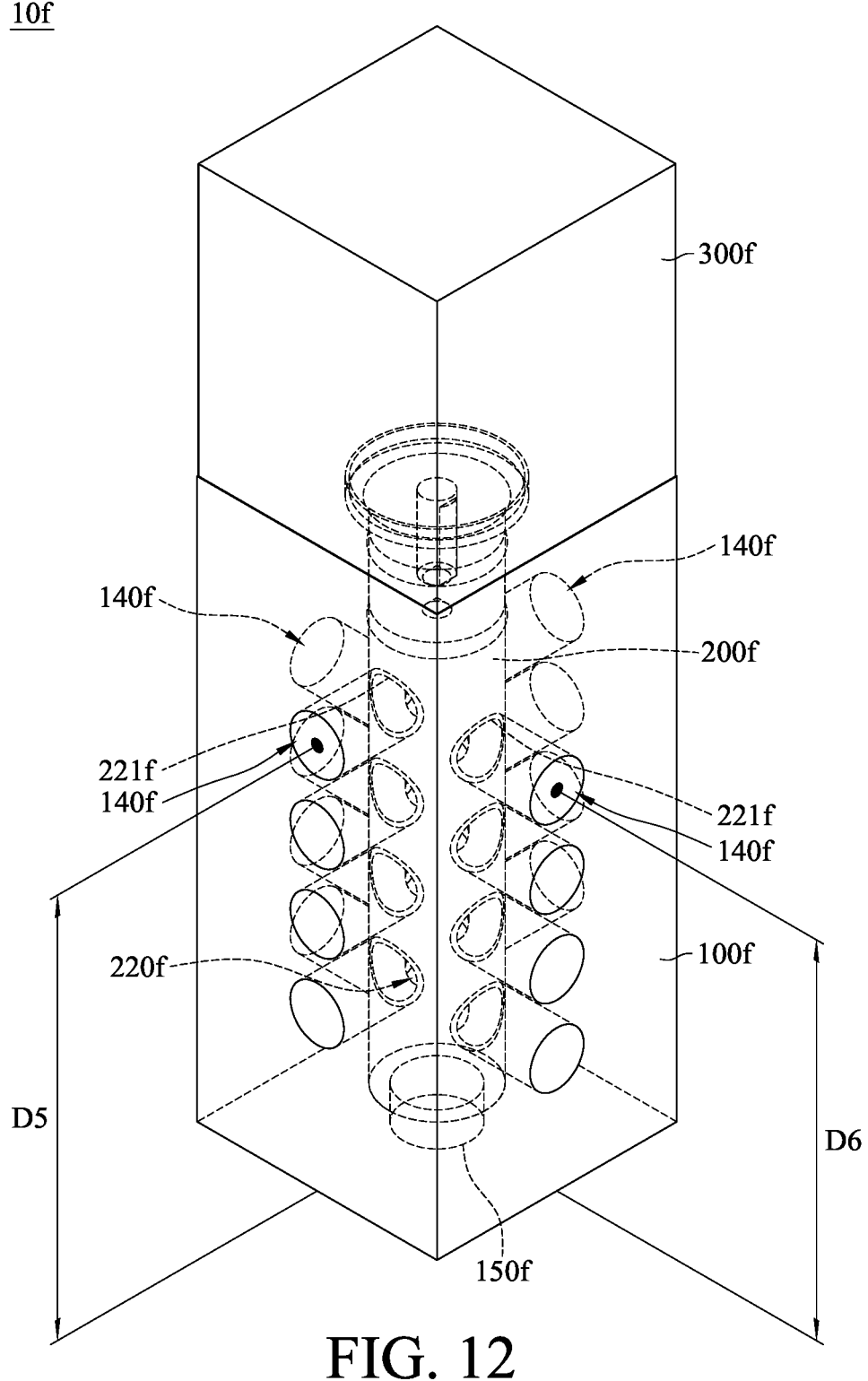
FIG. 12 is a perspective view of a control valve according to a sixth embodiment of the present disclosure.

Please refer to FIGS. 11 and 12. FIG. 11 is a perspective view of a control valve according to a fifth embodiment of the present disclosure. FIG. 12 is a perspective view of a control valve according to a sixth embodiment of the present disclosure.

As shown in FIG. 11, this embodiment provides a control valve 10e. The control valve 10e includes a valve body 100e, a valve gate 200e and a driving element 300e. The valve gate 200e is pivotably located inside the inner space 110e. The driving element 300e is fixed on the valve body 100e, and is configured to drive the valve gate 200e to pivot with respect to the valve body 100e.

In detail, the valve body 100e has a plurality of fluid inlets 140e and a fluid outlet 150e. From the viewpoint of FIG. 11, the fluid inlets 140e are divided into four groups, and the four groups of fluid inlets 140e are respectively located at four different sides of the valve body 100e. The fluid outlet 150e is located at the bottom surface of the valve body 100e.

The valve gate 200e has a main channel 220e. The main channel 220e has four groups of inlet ends 221e and an outlet end 222e. The inlet ends 221e correspond to the fluid inlets 140e, and the outlet end 222e corresponds to the fluid outlet 150e. The fluid inlets 140e and the inlet ends 221e are arranged along an axial direction of the valve gate 200d, and two of the fluid inlets 140e which are at the adjacent groups are on the same height. As shown in figure, a center of the most top fluid inlet 140e of one of the group has a height of D3 from the bottom surface, and a center of the most top fluid inlet 140e of the adjacent group has a height of D4 from the bottom surface, and D3 is equal to D4.

In addition, the embodiment in FIG. 12 is similar to the embodiment in FIG. 11, but they still have a difference in the arrangement of fluid inlets. As shown in FIG. 12, a center of the most top fluid inlet 140f of one of the group has a height of D5 from the bottom surface, and a center of the most top fluid inlet 140f of the adjacent group has a height of D6 from the bottom surface, and D5 is greater than D6.

Figure 13:
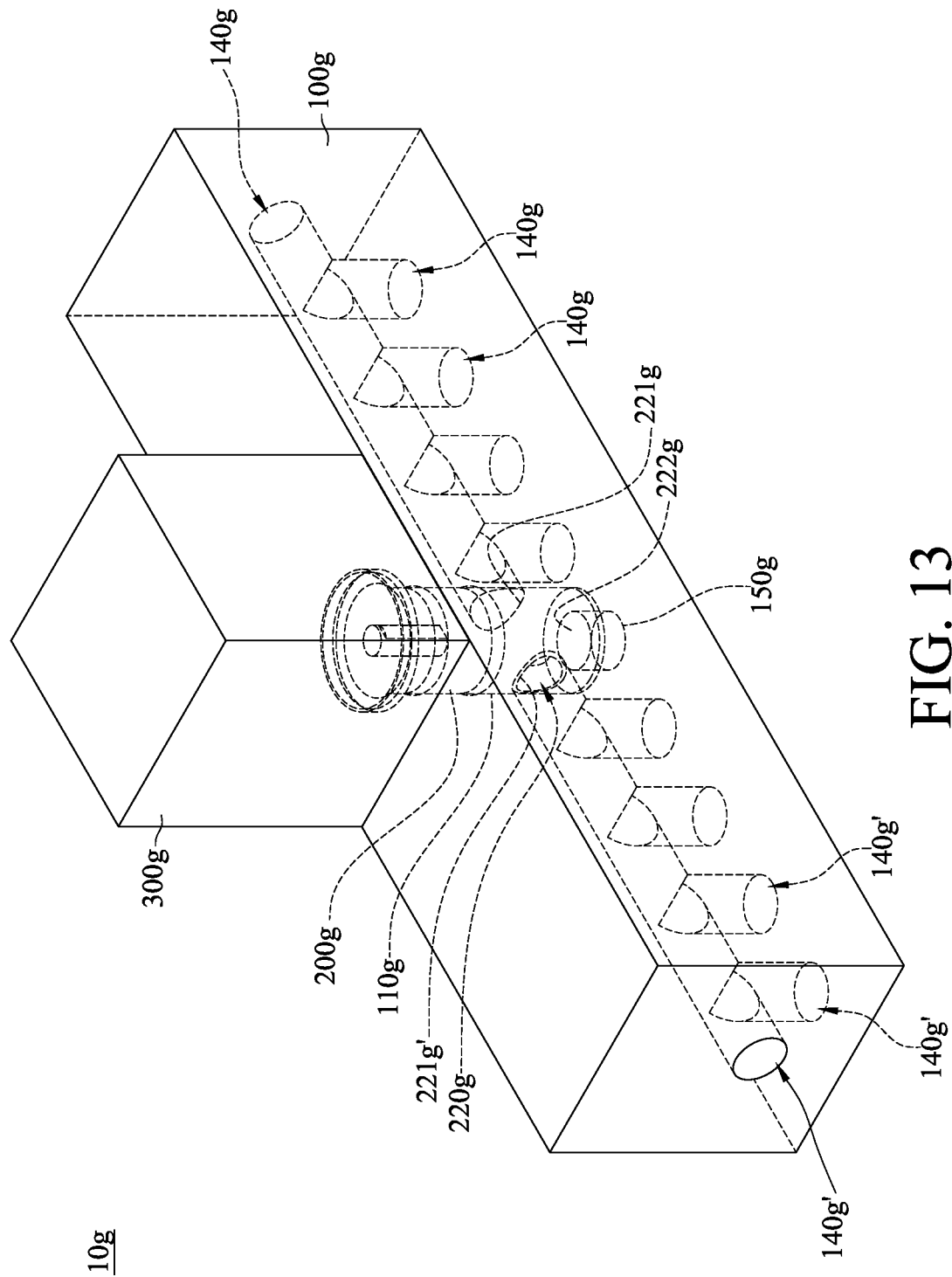
FIG. 13 is a perspective view of a control valve according to a seventh embodiment of the present disclosure.
Figure 14:
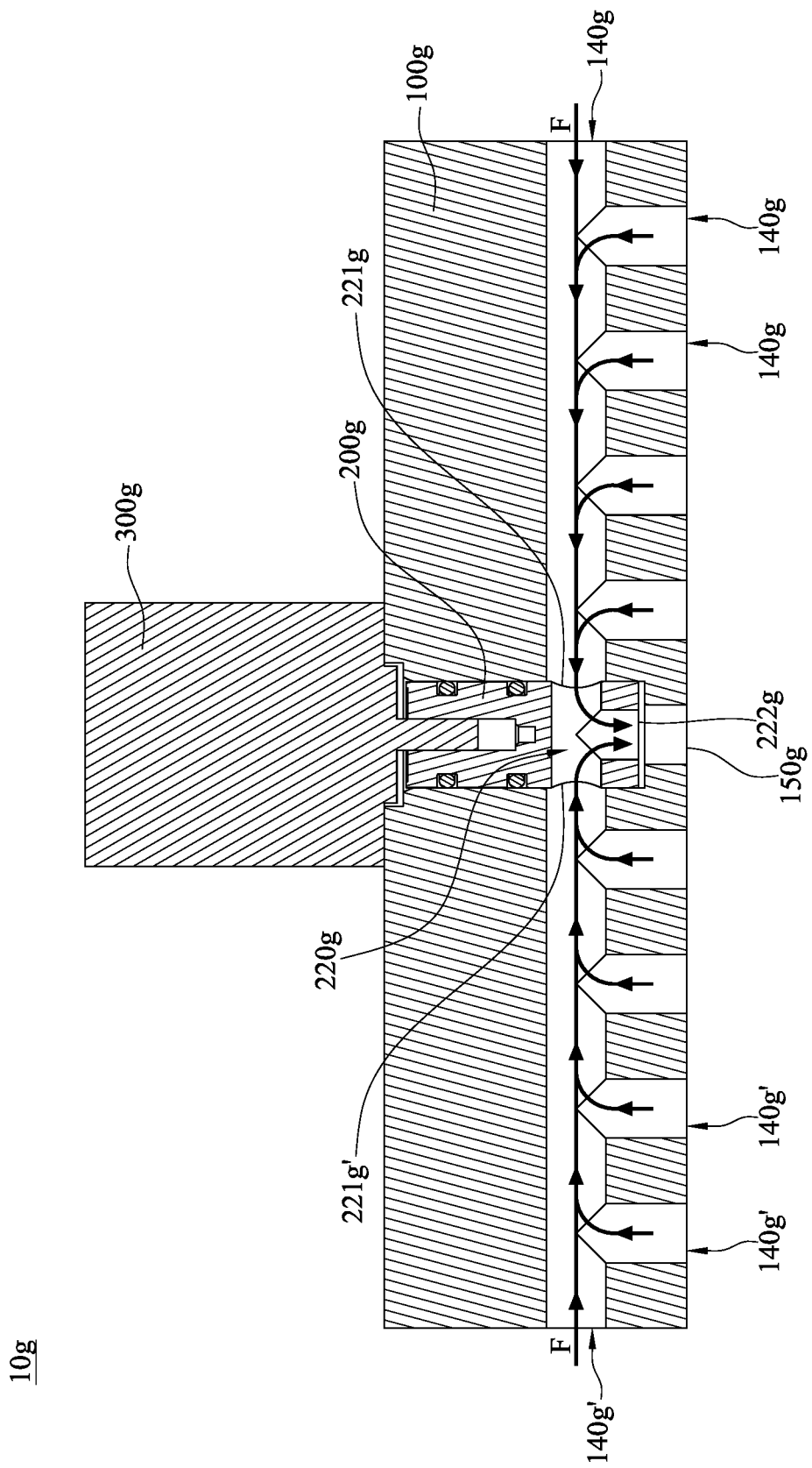
FIG. 14 is a cross-sectional view of FIG. 13.

Then, please refer to FIGS. 13 and 14. FIG. 13 is a perspective view of a control valve according to a seventh embodiment of the present disclosure. FIG. 14 is a cross-sectional view of FIG. 13.

This embodiment provides a control valve 10g. The control valve 10g includes a valve body 100g, a valve gate 200g and a driving element 300g. The valve gate 200g is pivotably located inside the inner space 110g. The driving element 300g is fixed on the valve body 100g, and is configured to drive the valve gate 200g to pivot with respect to the valve body 100g.

In detail, the valve body 100g has a plurality of first fluid inlets 140g, a plurality of second fluid inlets 140g' and a fluid outlet 150g. The fluid outlet 150g is located at the bottom surface of the valve body 100e. The first fluid inlets 140g are located at a side of the fluid outlet 150g. The second fluid inlets 140g' are located at another side of the fluid outlet 150g opposite to the first fluid inlets 140g, and the first fluid inlets 140g and the second fluid inlets 140g' are arranged along a radial direction of the valve gate 200g. In this embodiment, the first fluid inlets 140g and the second fluid inlets 140g' are respectively located at two opposite sides of the fluid outlet 150g, but the present disclosure is not limited thereto. In some other embodiments, the first fluid inlets and the second fluid inlets may be respectively located at two adjacent sides of the fluid outlet.

The valve gate 200g has a main channel 220g. The main channel 220g has a first inlet end 221g, a second inlet end 221g' and an outlet end 222g. The first inlet end 221g is connected to the first fluid inlets 140g, and the second inlet end 221g' is connected to the second fluid inlets 140g', and the outlet end 222g is connected to the fluid outlet 150g.

The embodiment in FIG. 13 shows a case of multiple fluid inlets and one fluid outlet, but the present disclosure is not limited thereto. In some other embodiments, it can be changed into a case of one fluid inlet and multiple fluid outlets.

Figure 15:
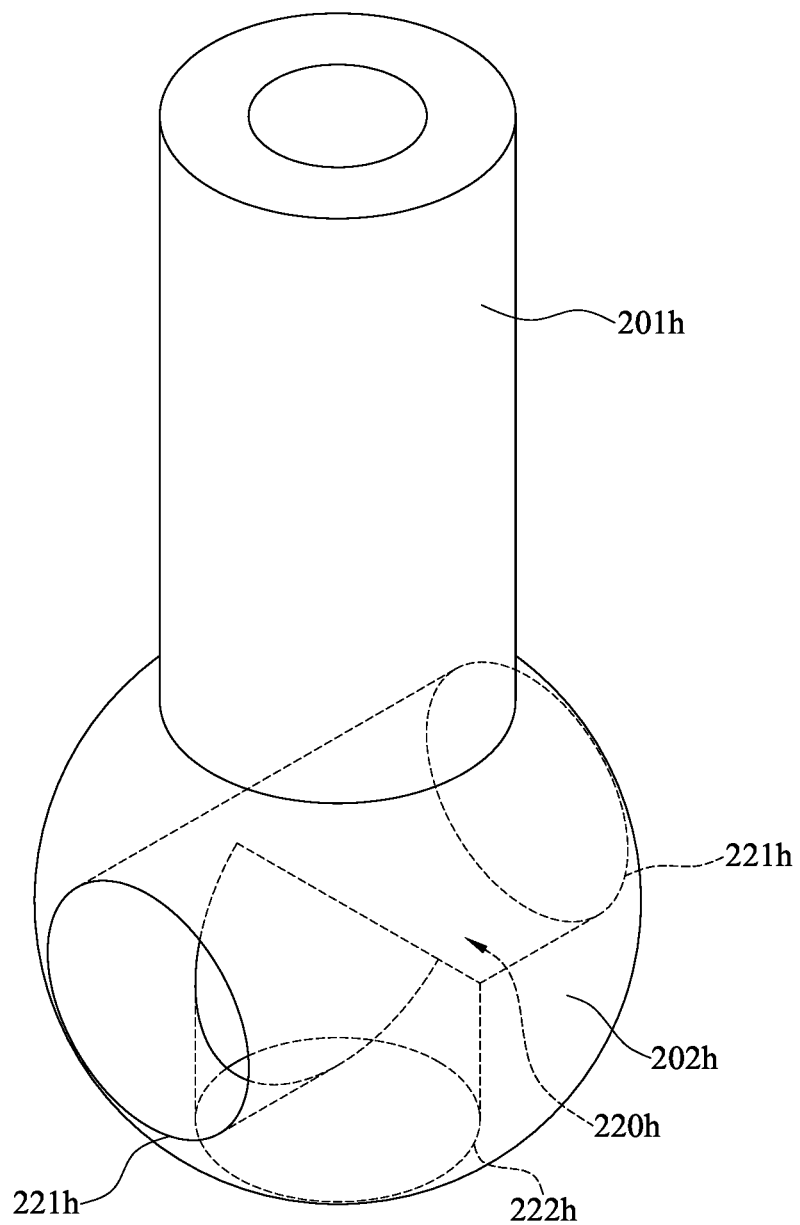
FIG. 15 is a perspective view of a control valve according to an eighth embodiment of the present disclosure.

In the case that the lower flow rate limit has no necessary to be zero, the cylindrical head may be changed into a spherical head. For example, please refer to FIG. 15. FIG. 15 is a perspective view of a control valve according to an eighth embodiment of the present disclosure.

This embodiment provides a valve gate 200h. The valve gate 200h includes an insertion portion 201h and a spherical head 202h which are connected to each other. The spherical head 202h has a main channel 220h. The main channel 220h has two inlet ends 221h and an outlet end 222h. The two inlet ends 221h are respectively located at two opposite sides of the spherical head 202h, the outlet end 222h is located between the two inlet ends 221h. The spherical head 202h can be disposed at a valve body, and the spherical head 202h and the valve body have a gap therebetween, such that the spherical head 202h and the valve body form a bypass channel therebetween.

Figure 16:
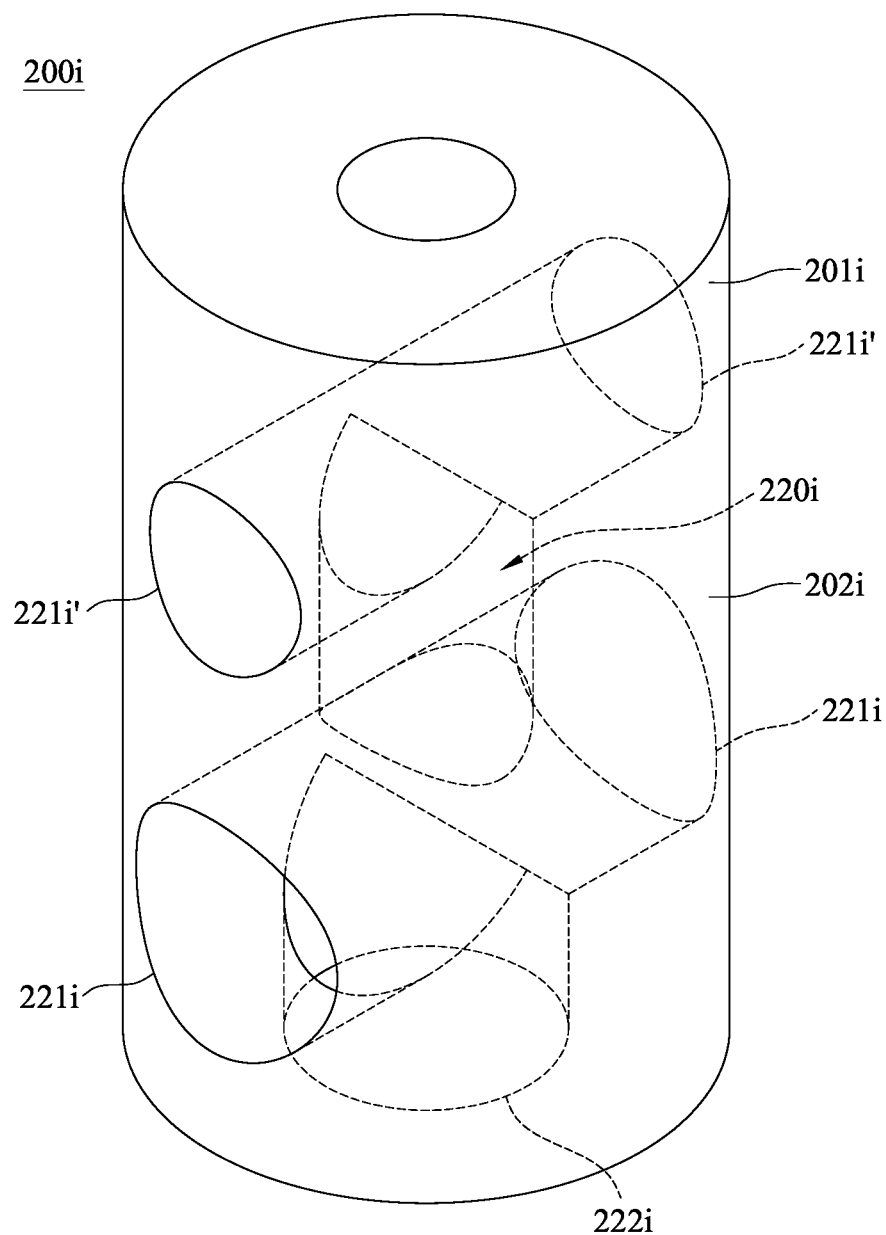
FIG. 16 is a perspective view of a control valve according to a ninth embodiment of the present disclosure.

Please refer to FIG. 16. FIG. 16 is a perspective view of a control valve according to a ninth embodiment of the present disclosure. This embodiment provides a valve gate 200i. The valve gate 200i includes an insertion portion 201i and a cylindrical head 202i which are connected to each other.

In detail, the cylindrical head 202i has a main channel 220i. The main channel 220i has a plurality of inlet ends 221i and 221i' and an outlet end 222i. The quantity of the inlet ends 221i is two, and the two inlet ends 221i are respectively located at two opposite sides of the cylindrical head 202i. The quantity of the inlet ends 221i' is two, and the two inlet ends 221i' are respectively located at two opposite sides of the cylindrical head 202i. The inlet ends 221i' are arranged along an axial direction of the valve gate 200i, and a cross-sectional area of the inlet end 221i is greater than a cross-sectional area of the inlet end 221i'. The outlet end 222i is located at a side of the cylindrical head 202i away from the insertion portion 201i. Similarly, the cylindrical head 202i can be disposed at a valve body, and the cylindrical head 202i and the valve body have a gap therebetween, such that the cylindrical head 202i and the valve body form a bypass channel therebetween.

In addition, in this embodiment, the inlet end 221i and the inlet end 221i' are both connected to an outlet end 222i, thus there is only one main channel, and the main channel has multiple inlet ends and one outlet end, but the present disclosure is not limited thereto. In some other embodiments, there may be more than one separated main channels which extend in a radial direction of the valve gate and are arranged along an axial direction of the valve gate. That is, the aforementioned outlet end 222i is removed, and the inlet end 221i or the inlet end 221i' is changed into an outlet end. In the case that the separated main channels are arranged in a vertical manner, the main channels are not connected to each other, the upper main channel has an inlet end and an outlet end respectively at opposite ends thereof, and the lower main channel has an inlet end and an outlet end respectively at opposite ends thereof. In addition, the extension directions of these two main channels are parallel or perpendicular to each other, and a cross-sectional area of the upper main channel is different from a cross-sectional area of the lower main channel.

Figure 17:
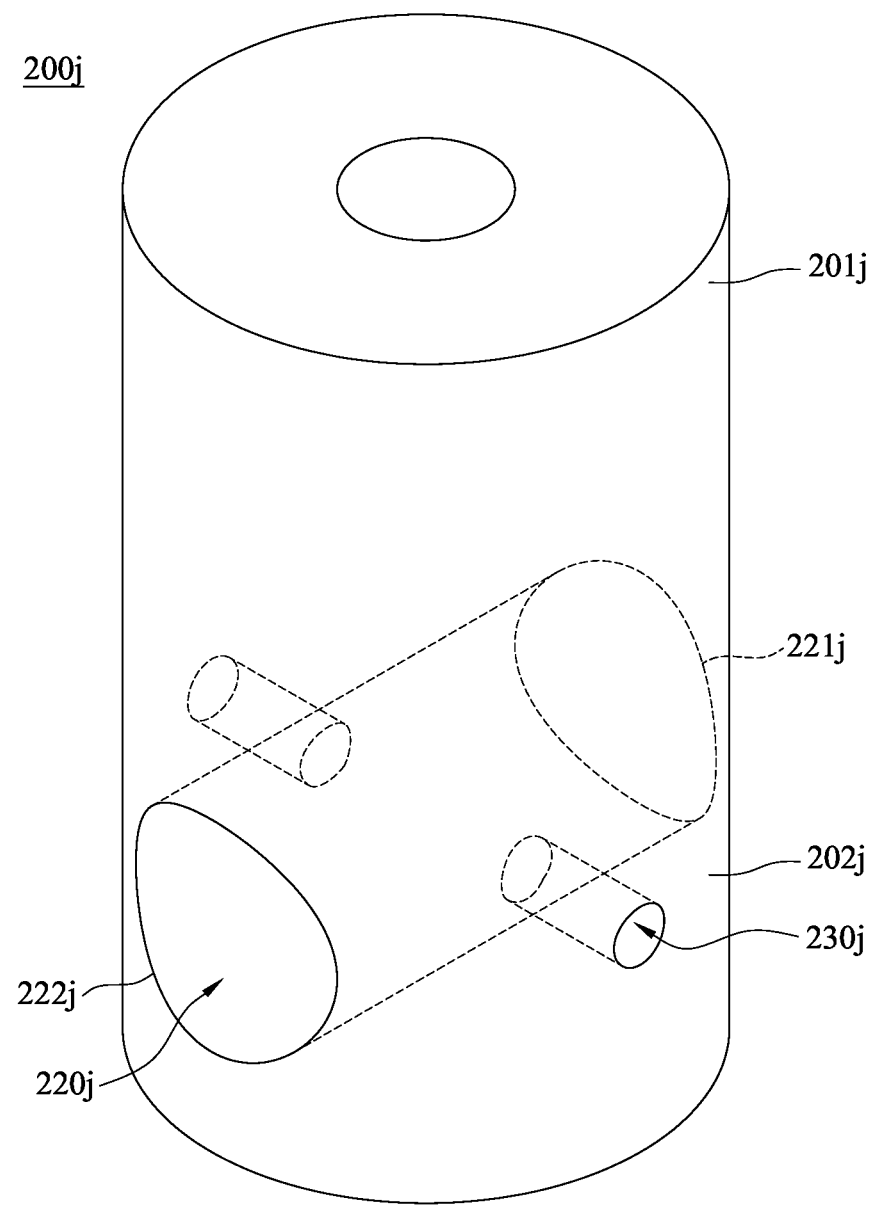
FIG. 17 is a perspective view of a control valve according to a tenth embodiment of the present disclosure.

In the above embodiment, the bypass channel is formed by the gap between the valve body and the valve gate, but the present disclosure is not limited thereto. Please refer to FIG. 17. FIG. 17 is a perspective view of a control valve according to a tenth embodiment of the present disclosure. This embodiment provides a valve gate 200j, and the valve gate 200j includes an insertion portion 201j and a cylindrical head 202j which are connected to each other.

In detail, the cylindrical head 202j has a main channel 220j and a bypass channel 230j. The main channel 220j has an inlet end 221j and an outlet end 222j. The inlet end 221j and the outlet end 222j are respectively located at two opposite sides of the cylindrical head 202i. A cross-sectional area of the bypass channel 230j is smaller than a cross-sectional area of the main channel 220j. The bypass channel 230j penetrates through the main channel 220j, and an extension direction of the bypass channel 230j is orthogonal to an extension direction of the main channel 220j. Therefore, when the inlet end 221j and the outlet end 222j of the main channel 220j are respectively aligned with the fluid inlet and the fluid outlet of the valve body (as the fluid inlet and the fluid outlet shown in FIG. 1), fluid can flow from the fluid inlet to the fluid outlet via the main channel 220j. When the inlet end 221j and the outlet end 222j of the main channel 220j and the fluid inlet and the fluid outlet of the valve body are completely unaligned (as the fluid inlet and the fluid outlet shown in FIG. 3), fluid can flow from the fluid inlet to the fluid outlet via the bypass channel 230j (i.e., fluid flows at a lower flow rate limit which is greater than zero).

Figure 18:
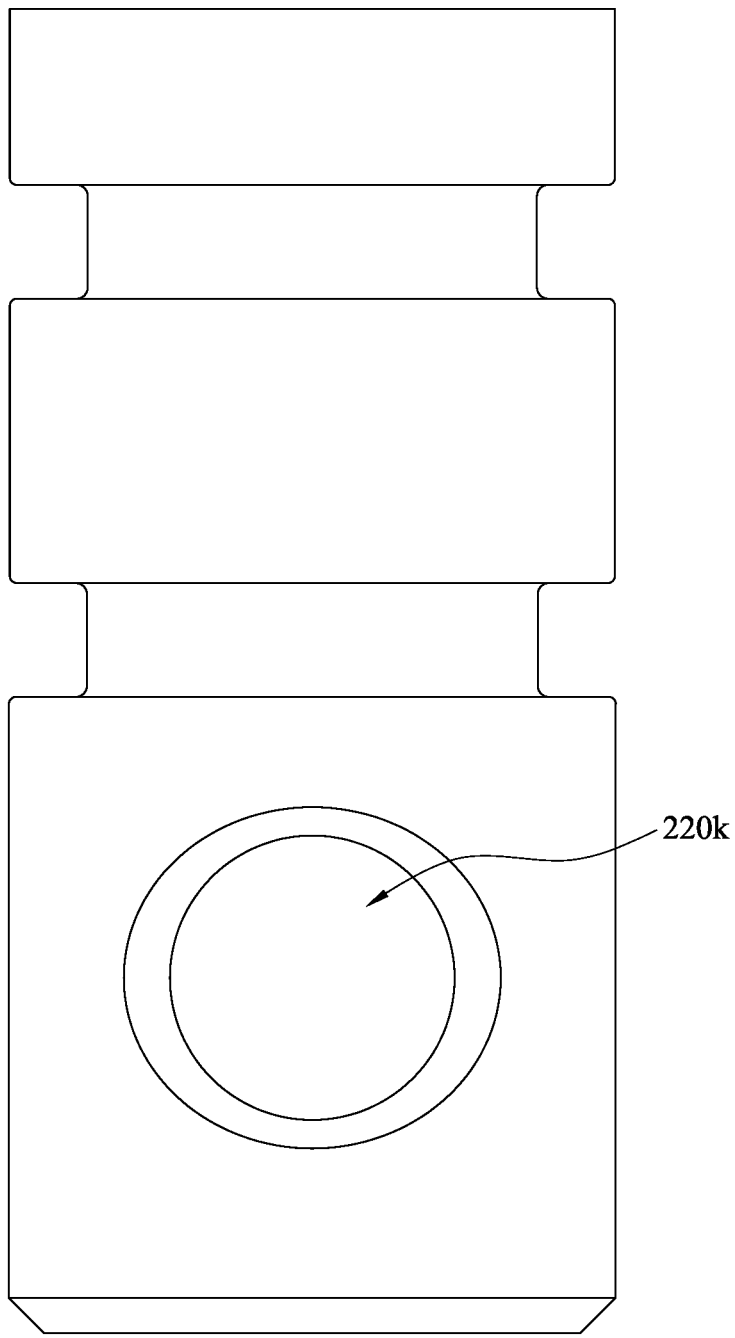
FIG. 18 is a perspective view of a control valve according to an eleventh embodiment of the present disclosure.

Please refer to FIG. 18. FIG. 18 is a perspective view of a control valve according to an eleventh embodiment of the present disclosure. A main channel 220k of a valve gate 200k has a cross section substantially in a circle, but the present disclosure is not limited thereto.

Figure 19:
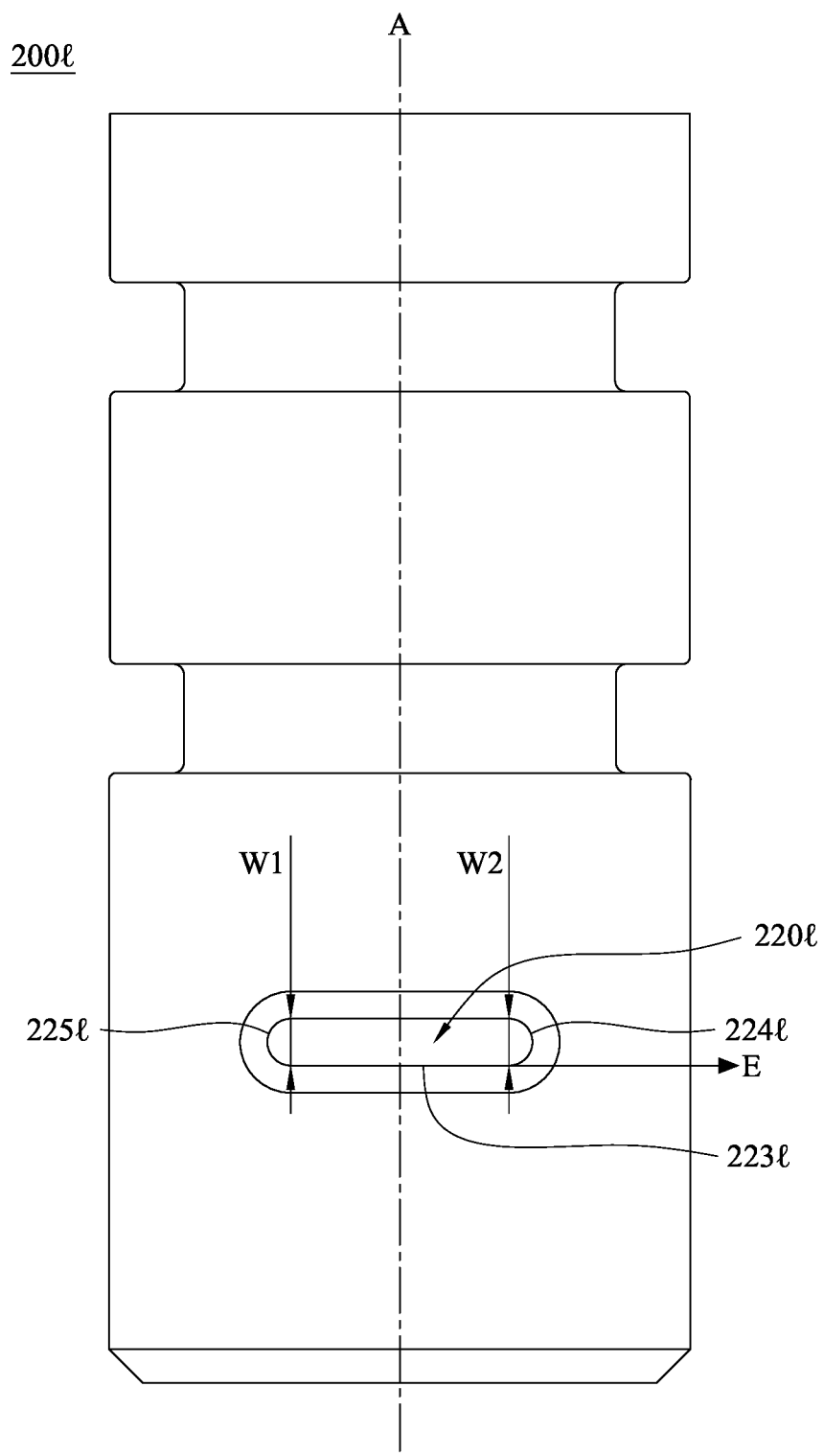
FIG. 19 is a perspective view of a control valve according to a twelfth embodiment of the present disclosure.

Please refer to FIG. 19. FIG. 19 is a perspective view of a control valve according to a twelfth embodiment of the present disclosure. This embodiment provides a valve gate 200l, and the valve gate 200l has a main channel 220l. The main channel 220l has a cross section having a first side 224l and a second side 225l opposite to each other. The first side 224l has a width W2, the second side 225l has a width W1, and the width W2 substantially equals to the width W1. In addition, in this embodiment, the cross section of the main channel 220l is a slot-shaped cross section, and a long side 223l of the cross section has an extension direction E which is orthogonal to an axis A of the valve gate 220l, but the present disclosure is not limited thereto. In some other embodiments, the long side of the cross section may be parallel to the axis of the valve gate.

Figure 20:
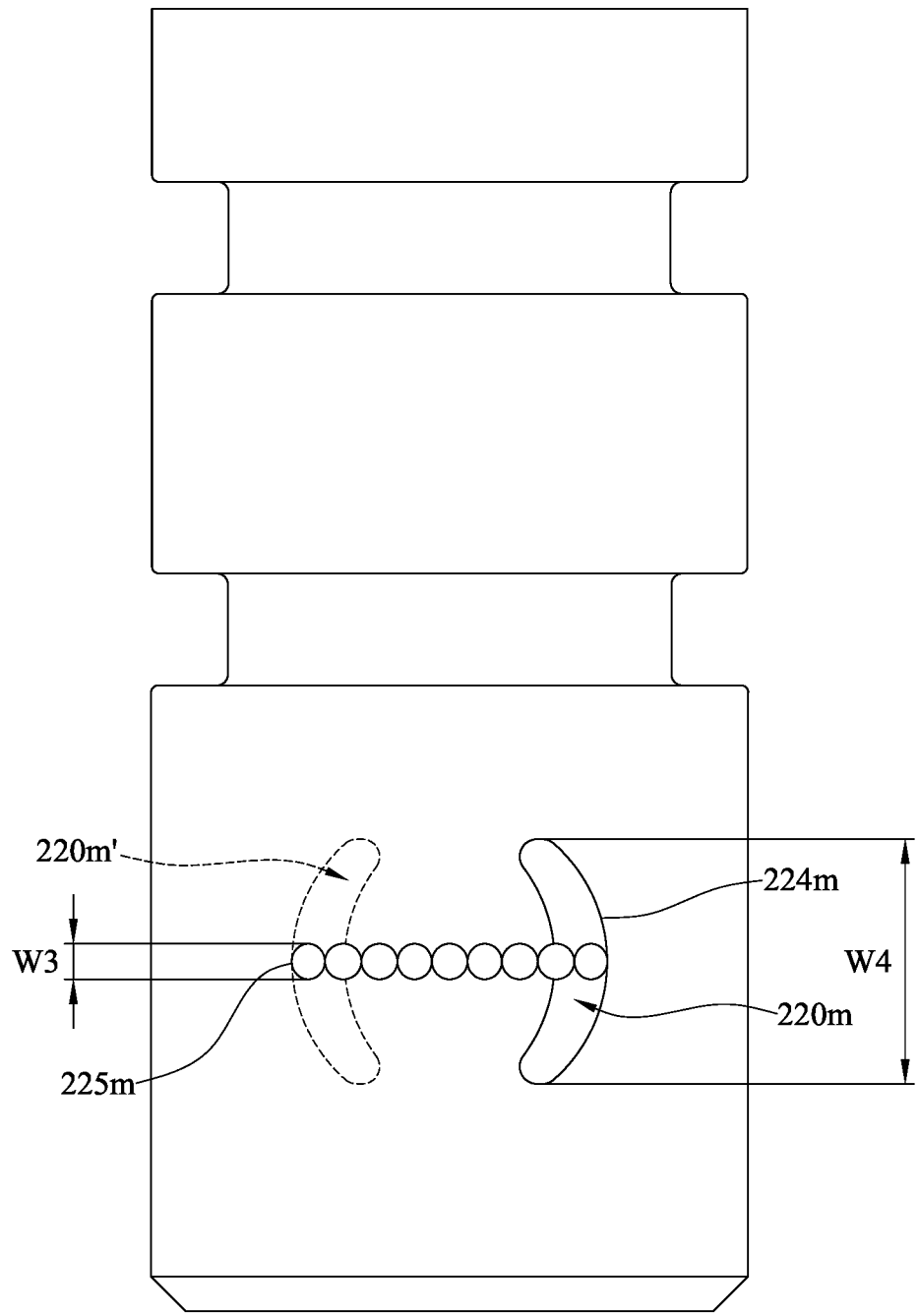
FIG. 20 is a perspective view of a control valve according to a thirteenth embodiment of the present disclosure.
Figure 21:
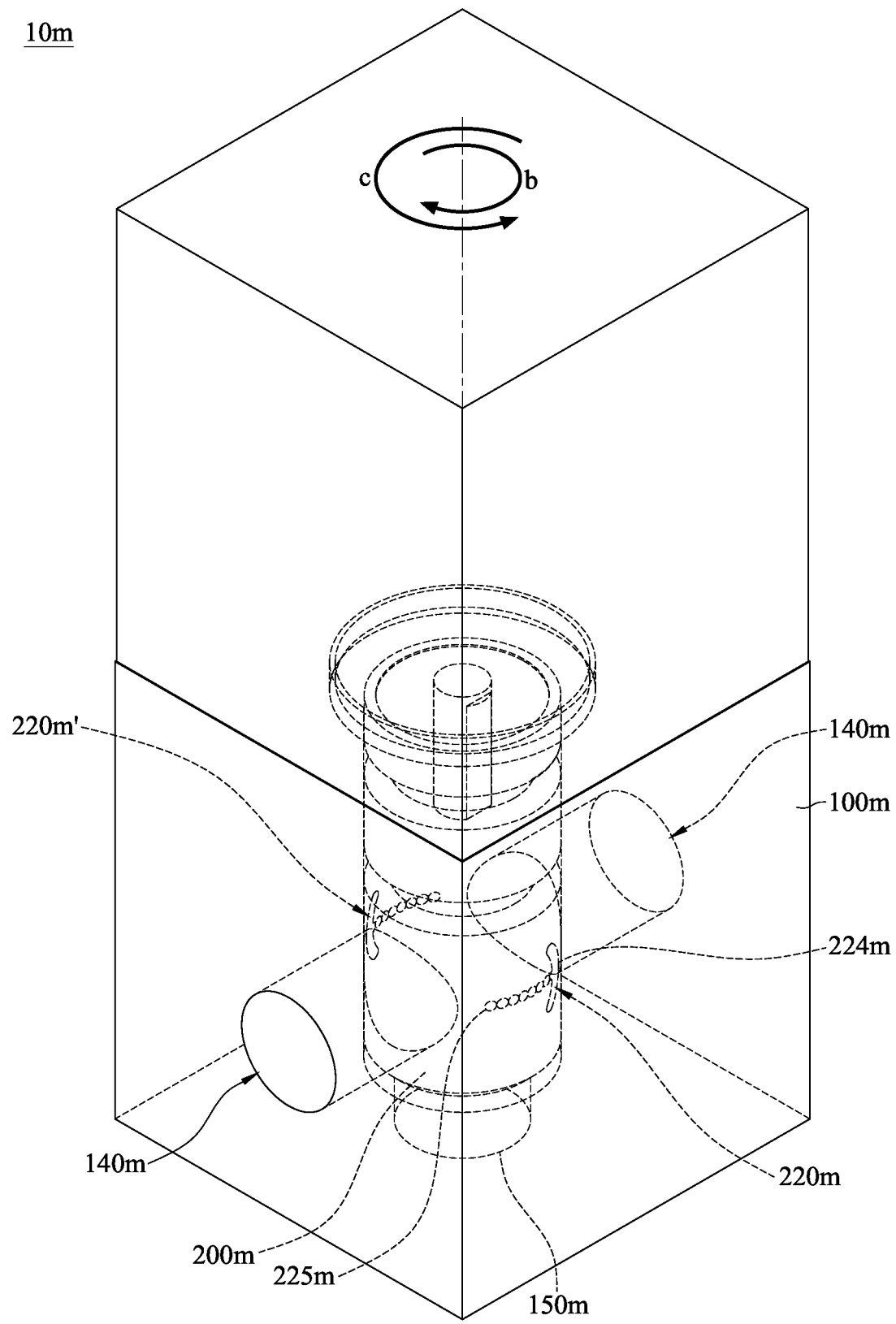
FIG. 21 is a perspective view of a valve gate disposed on a valve body when the valve gate is in a closed position.
Figure 22:
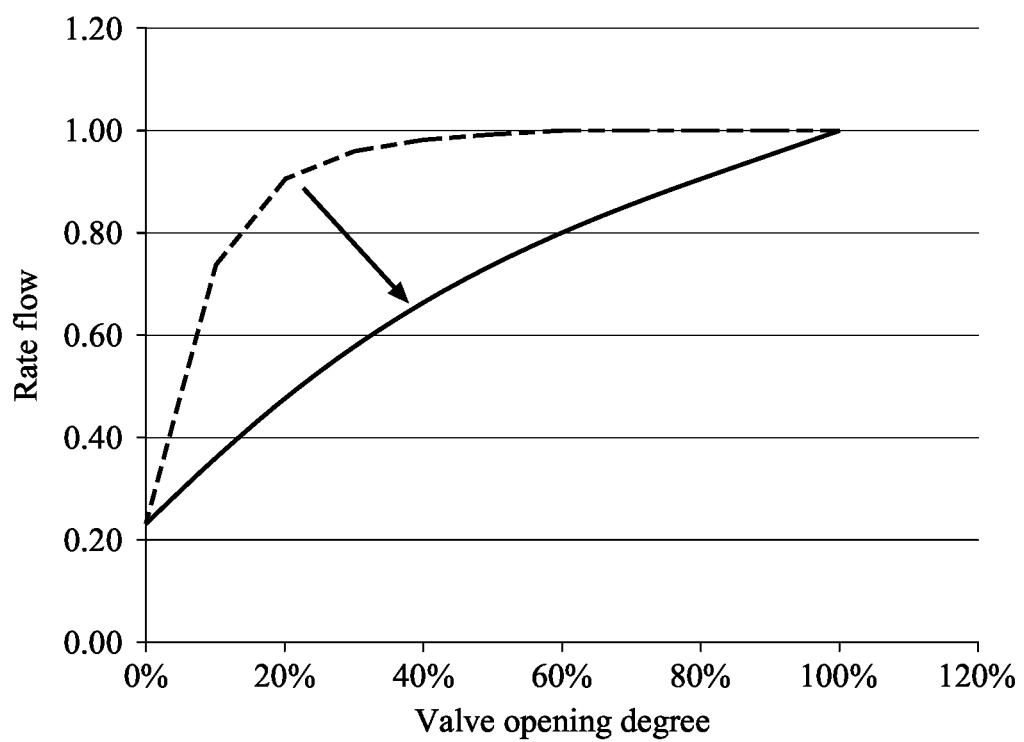
FIG. 22 is a line chart of valve opening degree versus fluid flow rate showing the difference between the circle-shaped valve port and the anchor-shaped valve port.

Then, please refer to FIGS. 20 to 22. FIG. 20 is a perspective view of a control valve according to a thirteenth embodiment of the present disclosure. FIG. 21 is a perspective view of a valve gate disposed on a valve body when the valve gate is in a closed position. FIG. 22 is a line chart of valve opening degree versus fluid flow rate showing the difference between the circle-shaped valve port and the anchor-shaped valve port.

As shown in FIG. 20, this embodiment provides a valve gate 200m, the valve gate 200m has a main channel. The main channel has a valve port 220m and a valve port 220m' which are opposite to each other, and the valve port 220m and the valve port 220m' each have an anchor-like shape. Take the valve port 220m for an example, the valve port 220m has a first side 224m and a second side 225m opposite to each other. The first side 224m has a width W4, the second side 225m has a width W3, and the width W4 is different from the width W3.

As shown in FIG. 21, the valve gate 200m is in the closed position, meaning that the valve ports 220m and 220m' of the valve gate 200m are not aligned with two fluid inlets 140m of a valve body 100m. The valve gate 200m can be pivoted 90 degrees with respect to the valve body 100m in a direction of b so as to be switched to the opened position. When the valve gate 200m is in the opened position, the valve ports 220m and 220m' are respectively aligned with the fluid inlets 140m, such that fluid can flow from the fluid inlets 140m to the fluid outlet 150m. Then, the valve gate 200m can be pivoted in a direction of c to be switched back to the closed position.

The reason why the widths are different is to make the flow rate control of the valve gate 200m more of a linear trend line. In detail, in the embodiment that the cross section of the main channel in a circle as shown in FIG. 1, the relationship between the valve opening degree and the fluid flow rate does not perform a smooth linear line but a line that goes up rapidly and then levels off (as the dotted line shown in FIG. 22). In contrast, in the embodiment that the cross section of the main channel in an anchor-like shape as shown in FIG. 20, in the preliminary of opening the valve gate 200m, the middle portion of the anchor-like shape (closer to the second side 225m) which has a narrower width is aligned with the fluid inlet first, and then the curved portion of the anchor-like shape (closer to the first side 224m) which has a wider width is aligned with the fluid inlet while the valve gate 200m opens wider. The middle portion of the anchor-like shape with a narrower width helps the relationship between the valve opening degree and the fluid flow rate to vary in a slower manner when the valve gate is preliminarily opened, and the curved portion of the anchor-like shape with a wider width helps the relationship to vary more rapidly when the valve gate is more opened. As the solid line shown in FIG. 22, the relationship between the valve opening degree and the fluid flow rate becomes more of a linear trend line. It is noted that, as long as the width W4 of the first side 224m is different from the width W3 of the second side 225m, having an anchor-like shaped cross section of valve port would not be the only solution to make the relationship more of a linear trend line.

From the viewpoint of FIG. 20, the first sides 224m of the valve port 220m and the valve port 220m' are pivoted in the same direction, meaning that the two anchor-like shape point in opposite directions. Therefore, while the valve gate 200m is pivoted in the direction of b, both of the valve ports 220m and 220m' of the main channel align with the fluid inlet 140m via the middle portions of the anchor-like shapes (the portions closer to the second sides 225m), and then gradually align with the fluid inlet 140m via the curved portions of the anchor-like shapes. As such, the relationship between the valve opening degree and the fluid flow rate can vary in a slower manner because the middle portion of the anchor-like shape has a narrower width, and the relationship can vary more rapidly because the curved portion of the anchor-like shape has a wider width.

Figure 24:
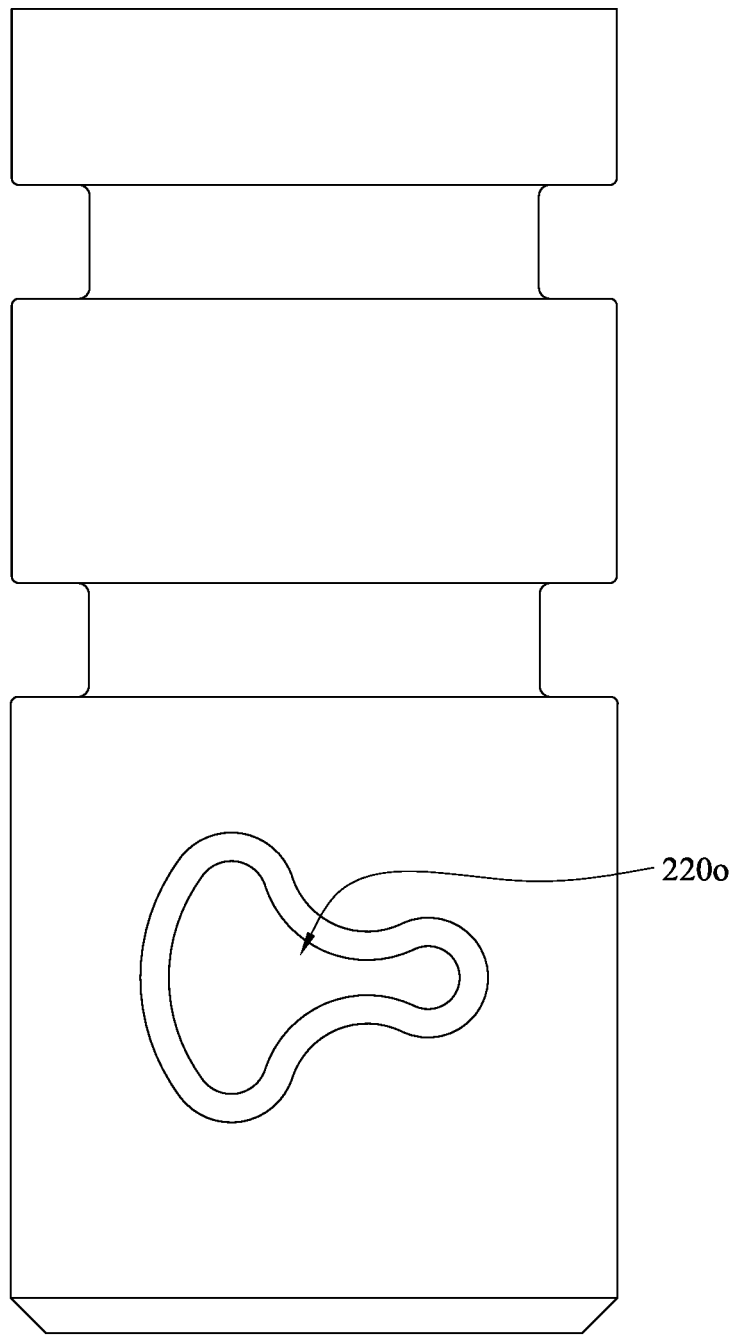
FIG. 24 is a perspective view of a control valve according to a fifteenth embodiment of the present disclosure.
Figure 25:
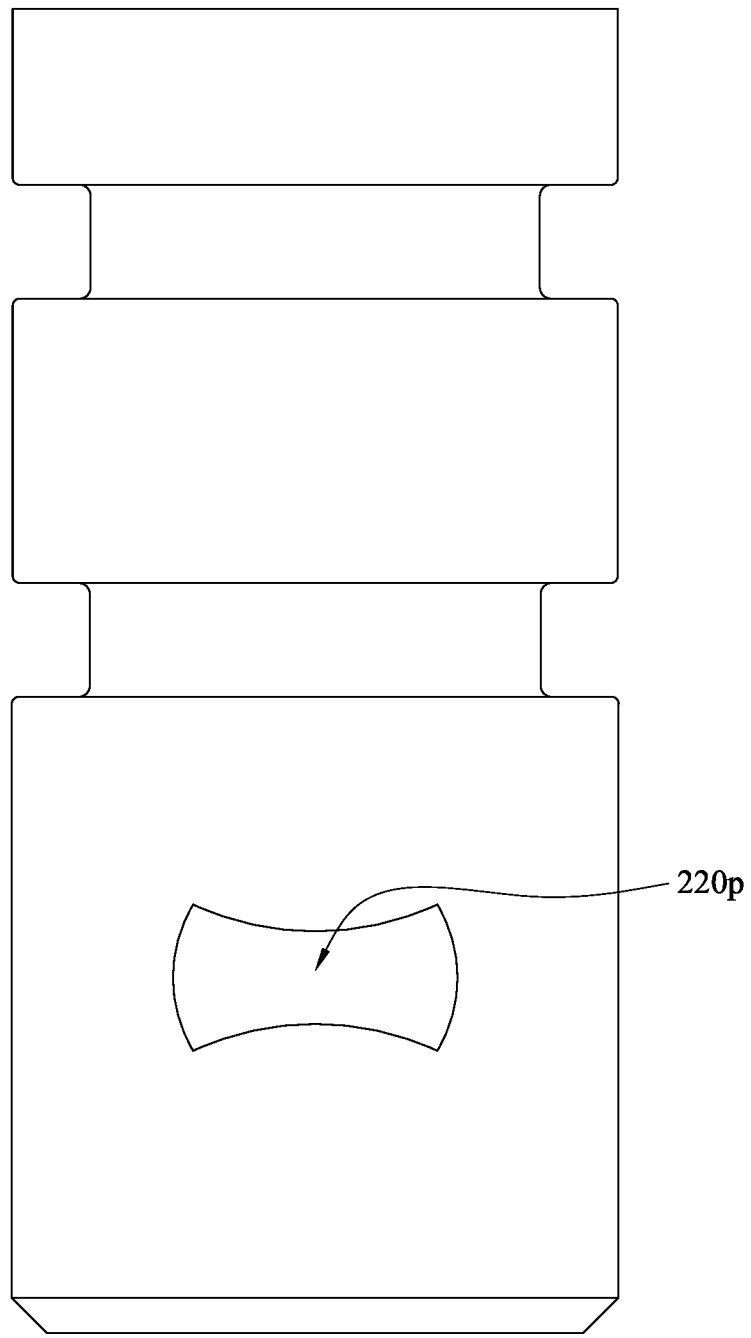
FIG. 25 is a perspective view of a control valve according to a sixteenth embodiment of the present disclosure.
Figure 26:
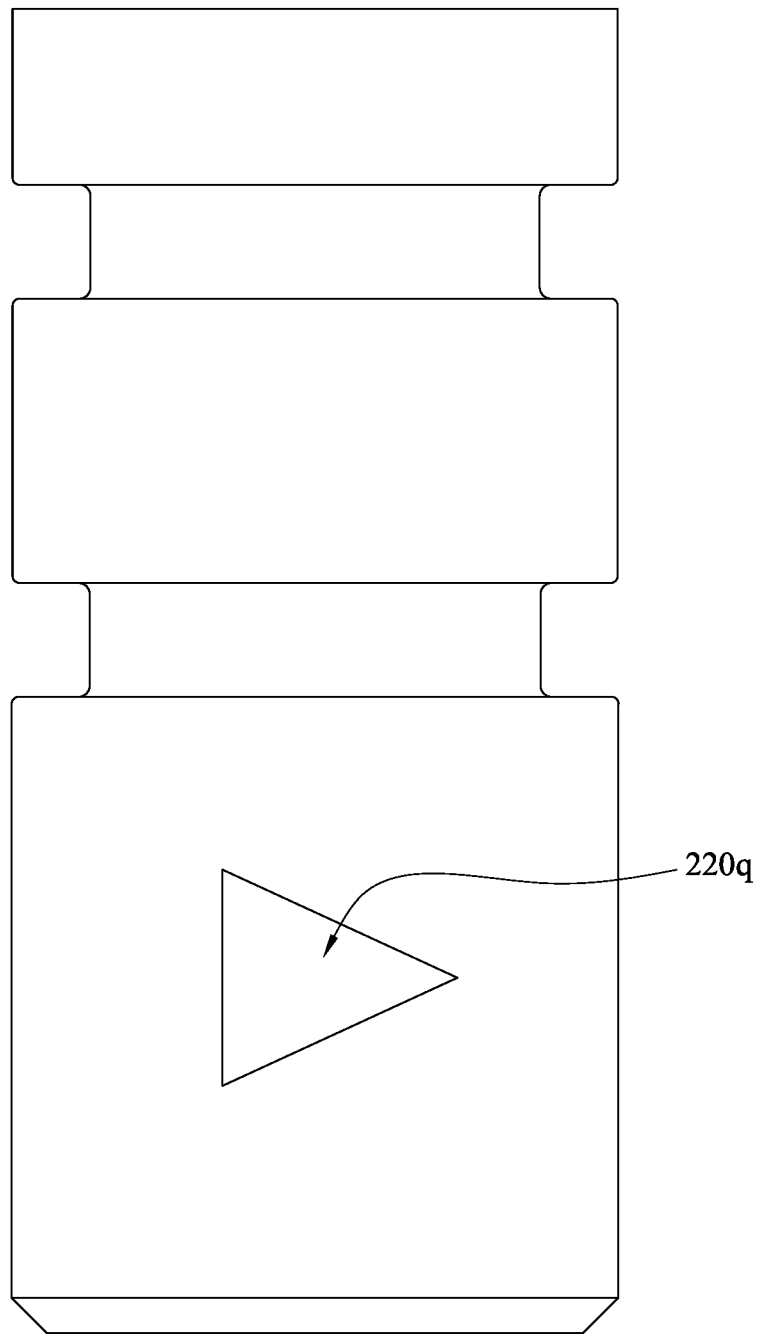
FIG. 26 is a perspective view of a control valve according to a seventeenth embodiment of the present disclosure.
Figure 27:
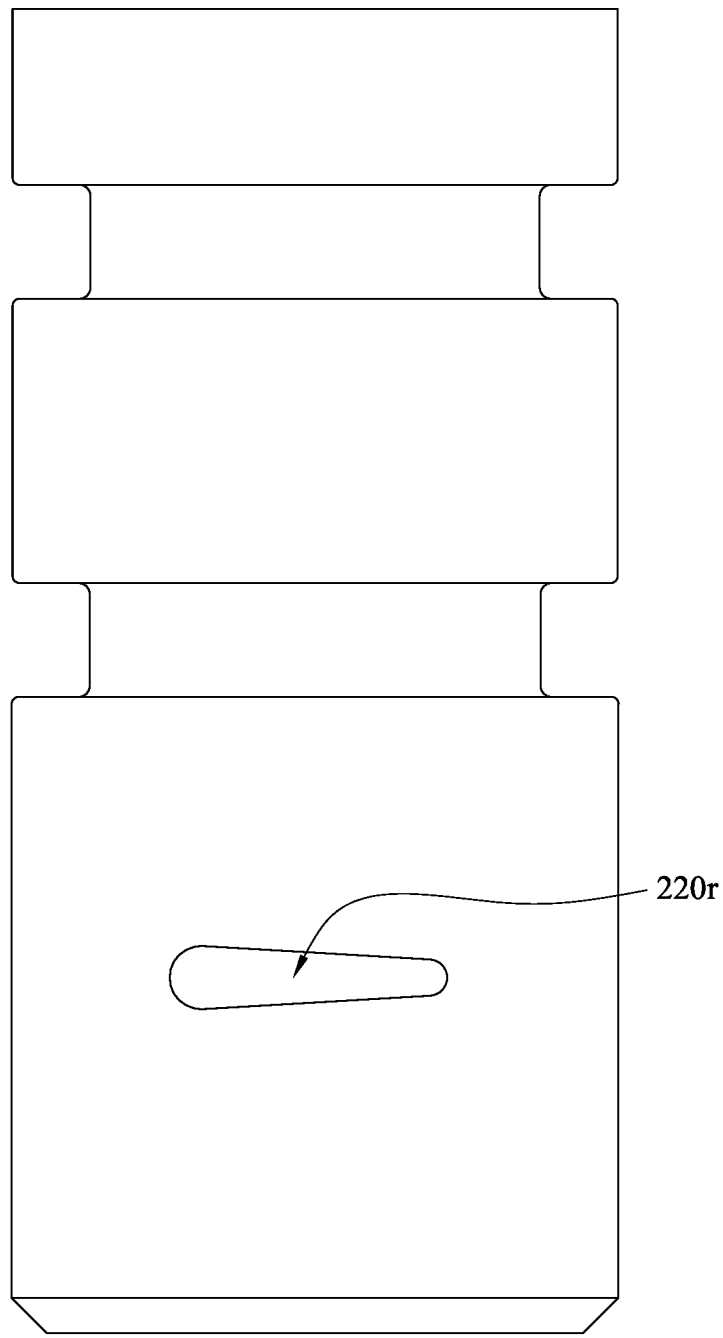
FIG. 27 is a perspective view of a control valve according to an eighteenth embodiment of the present disclosure.
Figure 28:
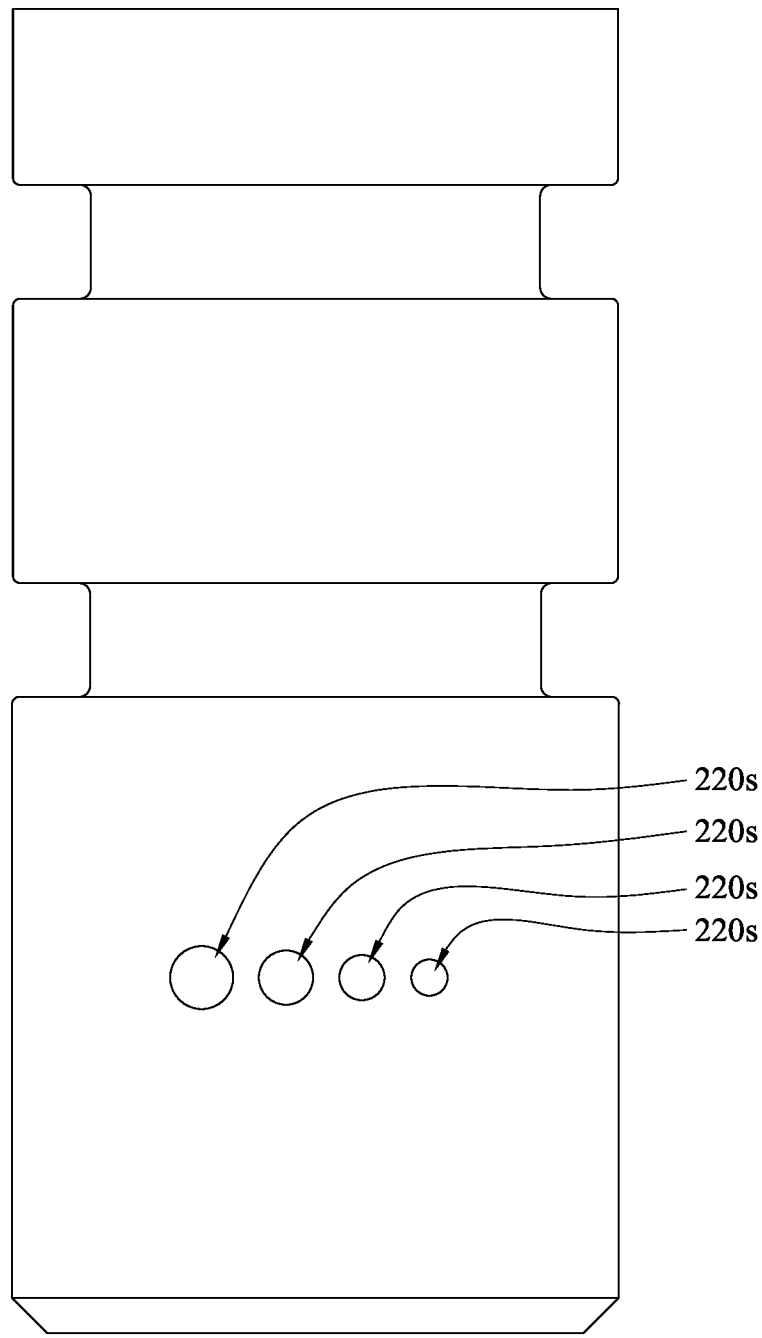
FIG. 28 is a perspective view of a control valve according to a nineteenth embodiment of the present disclosure.
Figure 29:
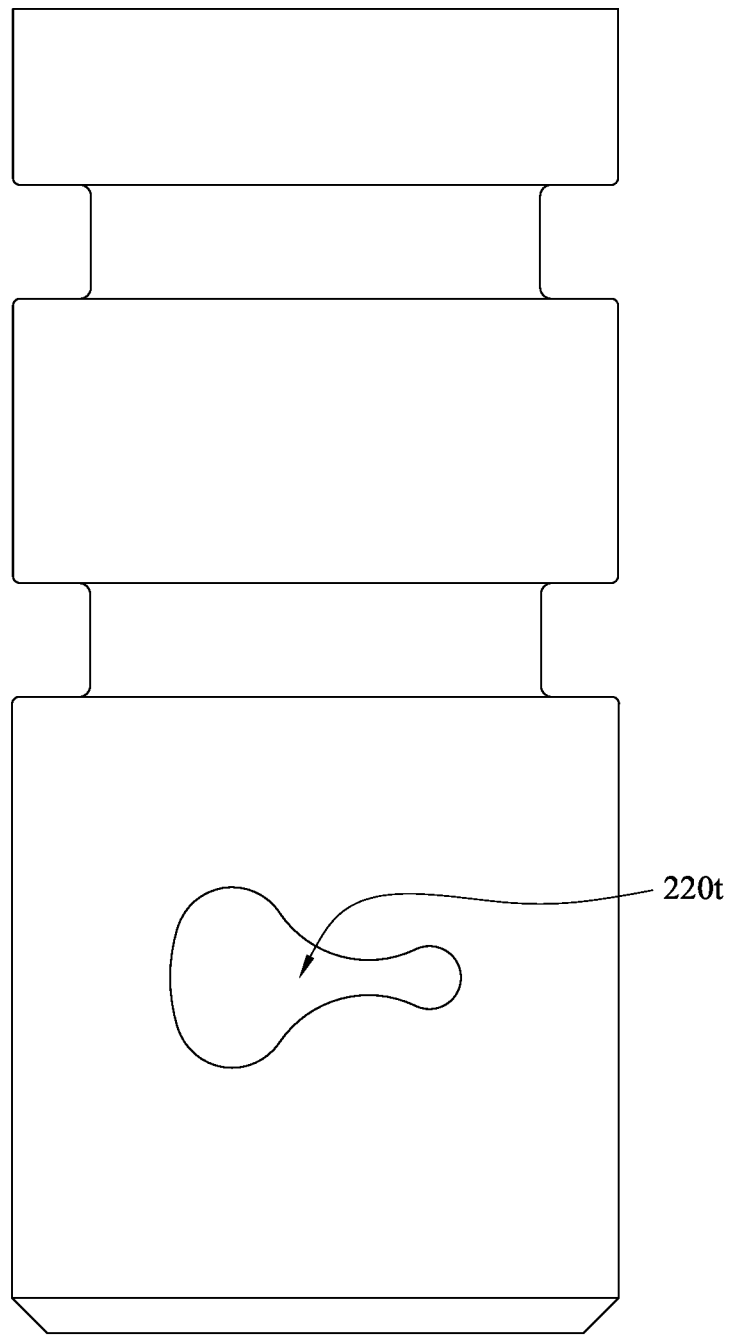
FIG. 29 is a perspective view of a control valve according to a twentieth embodiment of the present disclosure.

In addition, the present disclosure is not limited to the shape of the valve port. For example, please refer to FIGS. 23 to 29, FIG. 23 is a perspective view of a control valve according to a fourteenth embodiment of the present disclosure. FIG. 24 is a perspective view of a control valve according to a fifteenth embodiment of the present disclosure. FIG. is a perspective view of a control valve according to a sixteenth embodiment of the present disclosure. FIG. 26 is a perspective view of a control valve according to a seventeenth embodiment of the present disclosure. FIG. 27 is a perspective view of a control valve according to an eighteenth embodiment of the present disclosure. FIG. 28 is a perspective view of a control valve according to a nineteenth embodiment of the present disclosure. FIG. 29 is a perspective view of a control valve according to a twentieth embodiment of the present disclosure.

Figure 23:
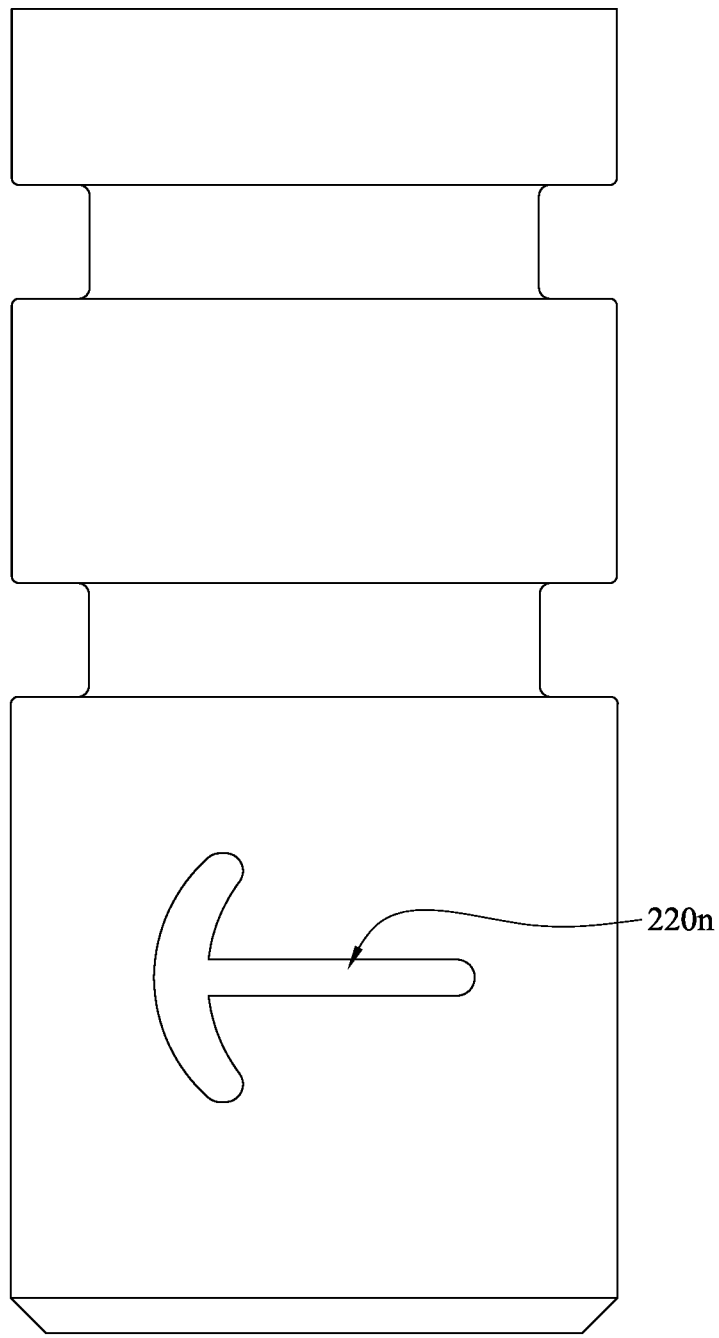
FIG. 23 is a perspective view of a control valve according to a fourteenth embodiment of the present disclosure.

As shown in FIG. 23, a valve gate 200n has a main channel 220n, and the main channel 220n has an anchor-like shaped cross section, but the anchor-like shape in FIG. 23 and the anchor-like shape in FIG. 20 point in opposite directions. As shown in FIG. 24, a valve gate 200o has a main channel 220o, and the main channel 220o has a pear-shaped cross section. As shown in FIG. 25, a valve gate 200p has a main channel 220p, and the main channel has a cross section which has a narrowed middle part. As shown in FIG. 26, a valve gate 200q has a main channel 220q, and the main channel 220q has a triangular cross section. As shown in FIG. 27, a valve gate 200r has a main channel 220r, and the main channel 220r has a baseball bat-shaped cross section. As shown in FIG. 28, a valve gate 200s has a plurality of main channels 220s which are arranged in an order of size along a radial direction of the valve gate 200s. As shown in FIG. 29, a valve gate 200r has a main channel 220r, and the main channel 220r has another pear-shaped cross section.

According to the control valve as discussed in above, the control valve has a lower flow rate limit which is greater than zero when it is in the closed position, which ensures fluid to still flow to a lower temperature heat source even when most of the fluid flows to a higher temperature heat source, thereby having a minimal cooling effect on the lower temperature heat source.

Furthermore, the lower flow rate limit has no necessary to be zero, thus it is acceptable to have a cylindrical valve gate but nor a spherical valve gate, and a diameter of the cylindrical valve gate can be smaller than a caliber of an opening of the valve body. Therefore, the valve gate can be directly installed into the valve body via the opening, which allows the valve body to be made of a single piece so as to simplify the processes of manufacturing and assembly.

Moreover, the different widths of the cross sections of the two sides of the main channel help the flow rate control of the valve gate to become more of a linear trend line.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A control valve, comprising:
a valve body having an inner space, wherein the valve body has two groups of fluid inlets and a fluid outlet, and the two groups of fluid inlets are respectively located at two opposite sides of the valve body, each of the two groups of fluid inlets comprises at least two fluid inlets, the fluid outlet is located at a bottom surface of the valve body; and
a valve gate, the valve gate movably located inside the inner space, wherein the valve gate has a main channel, the main channel has two groups of inlet ends which are opposite to each other and an outlet end, each of the two groups of inlet ends comprises at least two inlet ends, the two groups of inlet ends respectively correspond to the two groups of fluid inlets, and the outlet end corresponds to the fluid outlet, the two groups of fluid inlets and the two groups of inlet ends are arranged along an axial direction of the valve gate; wherein, the control valve having a lower flow rate limit which is greater than zero.

2. The control valve according to claim 1, wherein the valve gate is pivotably disposed on the valve body.

3. The control valve according to claim 1, wherein the main channel has a circle-shaped cross section.

4. A control valve, comprising:
a valve body having an inner space, wherein the valve body has two groups of fluid inlets and a fluid outlet, and the two groups of fluid inlets are respectively located at two opposite sides of the valve body, the fluid outlet is located at a bottom surface of the valve body; and a valve gate, the valve gate movably located inside the inner space, wherein the valve gate has a main channel, the main channel has two groups of inlet ends which are opposite to each other and an outlet end, the two groups of inlet ends respectively correspond to the two groups of fluid inlets, and the outlet end corresponds to the fluid outlet, the two groups of fluid inlets and the two groups of inlet ends are arranged along an axial direction of the valve gate;

when the two groups of inlet ends are respectively completely unaligned with the two groups of fluid inlets, the control valve has a lower flow rate limit which is greater than zero.

* * * * *